United States Patent
Guo et al.

(10) Patent No.: US 11,956,842 B2
(45) Date of Patent: Apr. 9, 2024

(54) MULTI-LINK COMMUNICATION SETUP METHOD AND RELATED APPARATUS

(71) Applicant: HUAWEI TECHNOLOGIES CO., LTD., Guangdong (CN)

(72) Inventors: Yuchen Guo, Shenzhen (CN); Guogang Huang, Shenzhen (CN); Yunbo Li, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/335,527

(22) Filed: Jun. 15, 2023

(65) Prior Publication Data
US 2023/0345565 A1    Oct. 26, 2023

Related U.S. Application Data

(63) Continuation of application No. PCT/CN2023/071457, filed on Jan. 9, 2023.

(30) Foreign Application Priority Data

Apr. 24, 2022 (CN) .......................... 202210435613.2

(51) Int. Cl.
*H04W 4/00* (2018.01)
*H04W 76/14* (2018.01)
(Continued)

(52) U.S. Cl.
CPC ........... *H04W 76/15* (2018.02); *H04W 76/14* (2018.02); *H04W 76/18* (2018.02); *H04W 84/12* (2013.01)

(58) Field of Classification Search
CPC ..... H04W 76/15; H04W 76/14; H04W 76/18; H04W 84/12
(Continued)

(56) References Cited

U.S. PATENT DOCUMENTS

2017/0086116 A1\*  3/2017  Ji ........................... H04W 36/14
2019/0174577 A1\*  6/2019  Patil ...................... H04W 76/11
(Continued)

FOREIGN PATENT DOCUMENTS

CN    112188644 A    1/2021
CN    112714472 A    4/2021
(Continued)

OTHER PUBLICATIONS

Guo et al., "CR for 35.3.5.4 Multi link Setup—IE usage," IEEE 802.11-21/0523r1, Mar. 22, 2021, 6 pages.
(Continued)

*Primary Examiner* — Marceau Milord
(74) *Attorney, Agent, or Firm* — Fish & Richardson P.C.

(57) ABSTRACT

Embodiments of this application relates to a multi-link communication setup method and a related apparatus. The method includes: a non-AP MLD sends an association request frame on a first link, to request multi-link setup. An AP MLD returns an association response frame on the first link, to notify whether multi-link setup succeeds. The AP MLD sets a second status code field of a multi-link element of the association response frame to a newly defined value, to indicate that a cause why a link is not accepted is that the first link is not accepted. This application is applied to a WLAN system that supports a next generation Wi-Fi protocol of 802.11ax, for example, 802.11be, Wi-Fi 7, or EHT, and other 802.11 series protocols; and for another example, a next generation protocol of 802.11be: Wi-Fi 8.

15 Claims, 9 Drawing Sheets

(51) Int. Cl.
*H04W 76/15* (2018.01)
*H04W 76/18* (2018.01)
*H04W 84/12* (2009.01)

(58) Field of Classification Search
USPC .................................. 370/329, 341, 342, 343
See application file for complete search history.

(56) References Cited

U.S. PATENT DOCUMENTS

| | | |
|---|---|---|
| 2021/0007168 A1 | 1/2021 | Asterjadhi et al. |
| 2021/0211235 A1 | 7/2021 | Chu et al. |
| 2021/0266931 A1 | 8/2021 | Kwon et al. |
| 2021/0274574 A1* | 9/2021 | Ghosh .................. H04W 48/12 |
| 2021/0282229 A1* | 9/2021 | Stacey ................. H04W 88/10 |
| 2021/0314846 A1* | 10/2021 | Chu .................... H04W 40/244 |
| 2022/0124855 A1 | 4/2022 | Hu et al. |
| 2022/0124857 A1* | 4/2022 | Patil .................... H04W 12/041 |
| 2023/0007572 A1* | 1/2023 | Patil ................. H04W 72/0446 |

FOREIGN PATENT DOCUMENTS

| | | |
|---|---|---|
| CN | 113747502 A | 12/2021 |
| CN | 113891495 A | 1/2022 |
| WO | 2022010260 A1 | 1/2022 |
| WO | 2022081659 A1 | 4/2022 |

OTHER PUBLICATIONS

Huang et al., "CC36 CR on BTM," 802.11 21/1254r4, Jul. 5, 2021, 7 pages.

Huawei et al., "Discussion on performance requirements for NR V2X multi-link test," 3GPP TSG-RAN WG4 Meeting #97-e, R4-2015642, Electronic Meeting, Nov. 2-13, 2020, 10 pages.

Office Action in Taiwanese Appln. No. 112115034, dated Jan. 25, 2024, 17 pages (with English machine translation).

* cited by examiner

MULTI-LINK COMMUNICATION SETUP METHOD AND RELATED APPARATUS

CROSS-REFERENCE TO RELATED APPLICATIONS

This application is a continuation of International Application No. PCT/CN2023/071457, filed on Jan. 9, 2023, which claims priority to Chinese Patent Application No. 202210435613.2, filed on Apr. 24, 2022. The disclosures of the aforementioned applications are hereby incorporated by reference in their entireties.

TECHNICAL FIELD

This application relates to the field of wireless communication technologies, and in particular, to a multi-link communication setup method and a related apparatus.

BACKGROUND

With development of wireless communication technologies, more wireless communication devices support multi-link (multi-link, ML) communication. For example, the devices support simultaneous communication on 2.4 GHz, 5 GHz, and 6 GHz frequency bands, or support communication on different channels of a same frequency band. This improves a communication rate between the devices. The device is commonly referred to as a multi-link device (multi-link device, MLD). The multi-link device usually includes a plurality of stations, and each station operates on a frequency band, a channel, or a link. If all stations in an MLD are access points (access point, AP), the MLD may further be referred to as an AP MLD. If all stations in an MLD are non-access point stations (non-access point station, non-AP STA), the MLD may further be referred to as a non-AP MLD. After a multi-link (which is also referred to as multi-link association) is set up, the non-AP MLD may communicate with the AP MLD.

During multi-link setup (or multi-link association), the non-AP MLD may send an association request frame to the AP MLD on a link (for ease of description, the link is denoted as a first link). The association request frame carries a multi-link element (multi-link element, MLE) used to carry information about the non-AP MLD and information about another link in the non-AP MLD. The association request frame is used to request to set up multi-link communication with the AP MLD. After receiving the association request frame on the first link, the AP MLD may return an association response frame to the non-AP MLD on the first link. The association response frame is used to notify the non-AP MLD whether multi-link communication is successfully set up. The association response frame may also carry an MLE used to carry information about the AP MLD and information about another link in the AP MLD.

According to a multi-link setup rule, if the first link is not accepted (or the first link fails to be set up), another link cannot be accepted (or another link cannot be successfully set up). When the first link is not accepted, the non-AP MLD does not know whether sending an association request frame on another link to request to set up multi-link communication with the AP MLD succeeds. Consequently, the non-AP MLD can only send an association request frame on each link to attempt to set up multi-link communication with the AP MLD, which causes low efficiency of multi-link setup.

SUMMARY

Embodiments of this application provide a multi-link communication setup method and a related apparatus, to improve efficiency of multi-link setup (or multi-link association).

The following describes this application from different aspects. It should be understood that mutual reference may be made to the following implementations and beneficial effect of the different aspects.

According to a first aspect, this application provides a multi-link communication setup method. The method includes: A first station of a non-AP MLD sends a first association request frame on a first link, and receives a first association response frame on the first link. The first association request frame includes a multi-link element, the multi-link element includes indication information, and the indication information indicates a second link. The first association response frame includes a first status code field and a multi-link element, and the multi-link element of the first association response frame includes a second status code field. A value of the first status code field is not 0, to indicate that the first link is not accepted, and the second status code field is set to a first value that is not 0, to indicate that a cause why the second link is not accepted is that the first link is not accepted.

In this application, the non-AP MLD has at least two links, and an AP MLD also has at least two links.

Optionally, the first station is any station in the non-AP MLD, and the first link is a link on which the first station operates.

Usually, if a link, in the non-AP MLD, for transmitting an association request frame is not accepted, another link cannot be accepted. However, causes why links are accepted or not be accepted may be different. Therefore, when the link, in the non-AP MLD, for transmitting the association request frame is not accepted, the non-AP MLD does not know whether multi-link communication with the AP MLD can be successfully set up if the association request frame is transmitted on another link. Consequently, the non-AP MLD can only send an association request frame on each link to attempt to set up multi-link communication, which causes low efficiency of multi-link setup.

However, in this application, the first status code field of the association response frame is set to a value that is not 0, and the second status code field of the multi-link element of the association response frame is set to the first value that is not 0, to indicate that a cause why the link corresponding to the second status code field is not accepted is that the transmitted link is not accepted, or to notify the non-AP MLD that if the association request frame is sent on the link corresponding to the second status code field, the link can be accepted. Therefore, the non-AP MLD may send the association request frame on the link for multi-link setup, to improve a probability that multi-link setup succeeds. In addition, the non-AP MLD does not need to attempt to set up multi-link communication on each link, to reduce a quantity of attempts, and improve efficiency of multi-link setup.

With reference to the first aspect, in a possible implementation, after the first station of the non-AP MLD receives the first association response frame on the first link, the method further includes: A second station of the non-AP MLD sends a second association request frame on the second link, and receives a second association response frame on the second link.

In this application, the first status code field of the first association response frame is set to the value that is not 0, and the second status code field of the multi-link element of the first association response frame is set to the first value that is not 0, to notify the non-AP MLD that if the association request frame is sent on the link corresponding to the second status code field, the link can be accepted (or successfully set up). Therefore, the non-AP MLD can learn of links on which the association request frame is sent to successfully set up multi-link communication with a high probability. This can improve a probability that multi-link setup succeeds, reduce a quantity of attempts, and improve efficiency of multi-link setup.

According to a second aspect, this application provides a multi-link communication setup method. The method includes: A first access point of an AP MLD receives a first association request frame on a first link, and sends a first association response frame on the first link. The first association request frame includes a multi-link element, the multi-link element includes indication information, and the indication information indicates a second link. The first association response frame includes a first status code field and a multi-link element, and the multi-link element of the first association response frame includes a second status code field. A value of the first status code field is not 0, to indicate that the first link is not accepted, and the second status code field is set to a first value that is not 0, to indicate that a cause why the second link is not accepted is that the first link is not accepted.

Optionally, the first access point is an access point, in the AP MLD, operating on the first link.

With reference to the second aspect, in a possible implementation, after the first access point of the AP MLD sends the first association response frame on the first link, the method further includes: A second access point of the AP MLD receives a second association request frame on the second link, and sends a second association response frame on the second link.

In a possible implementation of any one of the foregoing aspects, the first value may be a value that is not used or is not defined in an existing status code (Status Code) field, or the first value is any value from 0 to $(2^n-1)$ other than an existing value. n indicates a length of the status code field. The existing value includes, but is not limited to 0 to 135, or a value from 0 to 135 other than a reserved value (4, 8, 9, 20, 21, 26, 29, 36, 48, 66, 69 to 71, 90, 91, 114, 115, 127).

In a possible implementation of any one of the foregoing aspects, the first status code field is located in a frame body (frame body) of the association response frame. For example, the first status code field is located outside the multi-link element of the association response frame. In other words, the first status code field is not in the multi-link element of the association response frame (the Status Code field not in the multi-link element of the Association Response frame), or the first status code field is located in a core frame of the association response frame (the Status Code field in the core frame of the Association Response frame).

In a possible implementation of any one of the foregoing aspects, the second status code field is located in the multi-link element of the association response frame. For example, the second status code field is a status code field included in a STA profile (STA profile) field of a per-STA profile subelement (per-STA profile subelement) (the Status Code field included in the STA Profile subfield of the Per-STA Profile subelement).

According to a third aspect, this application provides a communication apparatus. The communication apparatus is specifically a non-AP MLD or a chip in a non-AP MLD, and the communication apparatus is configured to perform the method in any one of the first aspect or the possible implementations of the first aspect. The communication apparatus includes units configured to perform the method in any one of the first aspect or the possible implementations of the first aspect.

According to a fourth aspect, this application provides a communication apparatus. The communication apparatus is specifically an AP MLD or a chip in an AP MLD, and the communication apparatus is configured to perform the method in any one of the second aspect or the possible implementations of the second aspect. The communication apparatus includes units configured to perform the method in any one of the second aspect or the possible implementations of the second aspect.

In the third aspect or the fourth aspect, the communication apparatus may include a transceiver unit and a processing unit. For specific descriptions of the transceiver unit and the processing unit, refer to apparatus embodiments shown in the following. For beneficial effect of the third aspect and the fourth aspect, refer to the related descriptions of the first aspect and the second aspect. Details are not described herein again.

According to a fifth aspect, this application provides a multi-link communication setup method. The method includes: A first station of a non-AP MLD sends a first association request frame on a first link, and receives a first association response frame on the first link. The first association request frame includes a multi-link element, the multi-link element includes indication information, and the indication information indicates a second link. The first association response frame includes a first status code field and a multi-link element, and the multi-link element of the set to a value indicating that the first link is not accepted or a value indicating a cause why the first link is not accepted (for example, a value of the first status code field is not 0), and the second status code field is set to a value indicating that the second link is accepted (for example, a value of the second status code field is 0), to jointly indicate that a cause why the second link is not accepted is that the first link is not accepted.

Optionally, the first station is any station in the non-AP MLD, and the first link is a link on which the first station operates.

It may be understood that the value of the first status code field is not 0, to indicate that the first status code field does not indicate success (SUCCESS), in other words, the first link is not accepted. If the value of the second status code field is 0, it indicates that the second status code field indicates success, in other words, the second link can be accepted.

In this application, a setting rule and a corresponding interpretation rule of the first status code field and the second status code field are designed. When the first status code field does not indicate success but the second status code field indicates success, it indicates that the cause why the link corresponding to the second status code field is not accepted is that the first link is not accepted. Therefore, the non-AP MLD learns that if the association request frame is sent on the link for multi-link setup, there is a high probability that multi-link setup succeeds. This can improve a probability that multi-link setup succeeds, reduce a quantity of attempts, and improve efficiency of multi-link setup. In addition, a new status code value does not need to be defined in this application, to reduce overheads.

With reference to the fifth aspect, in a possible implementation, after the first station of the non-AP MLD receives the first association response frame on the first link, the method further includes: A second station of the non-AP MLD sends a second association request frame on the second link, and receives a second association response frame on the second link.

According to a sixth aspect, this application provides a multi-link communication setup method. The method includes: A first access point of an AP MLD receives a first association request frame on a first link, and sends a first association response frame on the first link. The first association request frame includes a multi-link element, the multi-link element includes indication information, and the indication information indicates a second link. The first association response frame includes a first status code field and a multi-link element, and the multi-link element of the first association response frame includes a second status code field. The first status code field is set to a value indicating that the first link is not accepted or a value indicating a cause why the first link is not accepted (for example, a value of the first status code field is not 0), and the second status code field is set to a value indicating that the second link is accepted (for example, a value of the second status code field is 0), to jointly indicate that a cause why the second link is not accepted is that the first link is not accepted.

Optionally, the first access point is an access point, in the AP MLD, operating on the first link.

With reference to the sixth aspect, in a possible implementation, after the first access point of the AP MLD sends the first association response frame on the first link, the method further includes: A second access point of the AP MLD receives a second association request frame on the second link, and sends a second association response frame on the second link.

With reference to the fifth aspect or the sixth aspect, in a possible implementation, the first status code field is located in a frame body (frame body) of the association response frame. For example, the first status code field is located outside the multi-link element of the association response frame. In other words, the first status code field is not located in the multi-link element of the association response frame, or the first status code field is located in a core frame of the association response frame.

With reference to the fifth aspect or the sixth aspect, in a possible implementation, the second status code field is located in the multi-link element of the association response frame. For example, the second status code field is a status code field included in a STA profile (STA profile) field of a per-STA profile subelement (per-STA profile subelement).

According to a seventh aspect, this application provides a communication apparatus. The communication apparatus is specifically a non-AP MLD or a chip in a non-AP MLD, and the communication apparatus is configured to perform the method in any one of the fifth aspect or the possible implementations of the fifth aspect. The communication apparatus includes units configured to perform the method in any one of the fifth aspect or the possible implementations of the fifth aspect.

According to an eighth aspect, this application provides a communication apparatus. The communication apparatus is specifically an AP MLD or a chip in an AP MLD, and the communication apparatus is configured to perform the method in any one of the sixth aspect or the possible implementations of the sixth aspect. The communication apparatus includes units configured to perform the method in any one of the sixth aspect or the possible implementations of the sixth aspect.

In the seventh aspect or the eighth aspect, the communication apparatus may include a transceiver unit and a processing unit. For specific descriptions of the transceiver unit and the processing unit, refer to apparatus embodiments shown in the following. For beneficial effect of the seventh aspect to the eighth aspect, refer to the related descriptions of the fifth aspect and the sixth aspect. Details are not described herein again.

According to a ninth aspect, this application provides a multi-link communication setup method. The method includes: A first station of a non-AP MLD sends a first association request frame on a first link, and receives a first association response frame on the first link. The first association request frame includes a multi-link element, the multi-link element includes indication information, and the indication information indicates a second link. The first association response frame includes a first status code field and a multi-link element, and the first status code field is set to a second value that is not 0, to indicate that multi-link setup between the non-AP MLD and an AP MLD fails, and that if the association request frame is transmitted on another requested link, multi-link setup may succeed. The multi-link element of the first association response frame includes a second status code field, to indicate a cause why the second link is accepted or not accepted.

Optionally, the first station is any station in the non-AP MLD, and the first link is a link on which the first station operates.

Optionally, the second value is a value that is not used or is not defined in an existing status code (Status Code) field, or the second value is any value from 0 to ($2^n-1$) other than an existing value. n indicates a length of the status code field. The existing value includes, but is not limited to 0 to 135, or a value from 0 to 135 other than a reserved value (4, 8, 9, 20, 21, 26, 29, 36, 48, 66, 69 to 71, 90, 91, 114, 115, 127).

In this embodiment of this application, the first status code field of the association response frame is set to a newly defined value (namely, the second value), to indicate that multi-link setup fails but one link exists, and when the association request frame is transmitted on the link, multi-link setup can succeed. Therefore, the non-AP MLD learns whether there is a probability that multi-link setup with the AP MLD succeeds, to avoid large power consumption of the non-AP MLD caused by continuous attempting of setting up multi-link communication by the non-AP MLD when a probability that multi-link setup succeeds is small.

With reference to the ninth aspect, in a possible implementation, after the first station of the non-AP MLD receives the first association response frame on the first link, the method further includes: A second station of the non-AP MLD sends a second association request frame on the second link, and receives a second association response frame on the second link.

According to a tenth aspect, this application provides a multi-link communication setup method. The method includes: A first access point of an AP MLD receives a first association request frame on a first link, and sends a first association response frame on the first link. The first association request frame includes a multi-link element, the multi-link element includes indication information, and the indication information indicates a second link. The first association response frame includes a first status code field and a multi-link element, and the first status code field is set to a second value that is not 0, to indicate that multi-link setup between the non-AP MLD and an AP MLD fails, and that if the association request frame is transmitted on another requested link, multi-link setup may succeed. The multi-link element of the first association response frame includes a second status code field, to indicate a cause why the second link is accepted or not accepted.

Optionally, the first access point is an access point, in the AP MLD, operating on the first link.

Optionally, the second value is a value that is not used or is not defined in an existing status code (Status Code) field, or the second value is any value from 0 to ($2^n-1$) other than an existing value. n indicates a length of the status code field. The existing value includes, but is not limited to 0 to 135, or a value from 0 to 135 other than a reserved value (4, 8, 9, 20, 21, 26, 29, 36, 48, 66, 69 to 71, 90, 91, 114, 115, 127).

With reference to the tenth aspect, in a possible implementation, after the first access point of the AP MLD sends the first association response frame on the first link, the method further includes: A second access point of the AP MLD receives a second association request frame on the second link, and sends a second association response frame on the second link.

With reference to the ninth aspect or the tenth aspect, in a possible implementation, a value of the second status code field is set to 0. The first status code field is set to the second value and the second status code field is set to 0, to jointly indicate that multi-link setup fails, and that if the association request frame is transmitted on the link corresponding to the second status code field, multi-link setup may succeed; or indicate that the cause why a link corresponding to the second status code field is not accepted is that the first link is not accepted (or multi-link setup fails).

In this application, the first status code field of the association response frame is set to a newly defined value (namely, the second value), and the second status code field of the multi-link element of the association response frame is set to 0 (or is set to indicate success), to jointly indicate that multi-link setup fails, and that if the association request frame is transmitted on the link corresponding to the second status code field, multi-link setup may succeed. Therefore, the non-AP MLD can learn of links on which the association request frame is sent to successfully set up multi-link communication. This can improve a probability that multi-link setup succeeds, reduce a quantity of attempts, and improve efficiency of multi-link setup.

With reference to the ninth aspect or the tenth aspect, in a possible implementation, the first status code field is located in a frame body (frame body) of the association response frame. For example, the first status code field is located outside the multi-link element of the association response frame. In other words, the first status code field is not located in the multi-link element of the association response frame; or the first status code field is located in a core frame of the association response frame.

With reference to the ninth aspect or the tenth aspect, in a possible implementation, the second status code field is located in the multi-link element of the association response frame. For example, the second status code field is a status code field included in a STA profile (STA profile) field of a per-STA profile subelement (per-STA profile subelement).

According to an eleventh aspect, this application provides a communication apparatus. The communication apparatus is specifically a non-AP MLD or a chip in a non-AP MLD, and the communication apparatus is configured to perform the method in any one of the ninth aspect or the possible implementations of the ninth aspect. The communication apparatus includes units configured to perform the method in any one of the ninth aspect or the possible implementations of the ninth aspect.

According to a twelfth aspect, this application provides a communication apparatus. The communication apparatus is specifically an AP MLD or a chip in an AP MLD, and the communication apparatus is configured to perform the method in any one of the tenth aspect or the possible implementations of the tenth aspect. The communication apparatus includes units configured to perform the method in any one of the tenth aspect or the possible implementations of the tenth aspect.

In the eleventh aspect or the twelfth aspect, the communication apparatus may include a transceiver unit and a processing unit. For specific descriptions of the transceiver unit and the processing unit, refer to apparatus embodiments shown in the following. For beneficial effect of the eleventh aspect and the twelfth aspect, refer to the related descriptions of the ninth aspect and the tenth aspect. Details are not described herein again.

According to a thirteenth aspect, this application provides a communication apparatus. The communication apparatus is a non-AP MLD, and the communication apparatus includes a processor, configured to perform the method in any one of the first aspect, the fifth aspect, and the ninth aspect, or the possible implementations of any one of the aspects. Alternatively, the processor is configured to execute a program stored in a memory. When the program is executed, the method in any one of the first aspect, the fifth aspect, and the ninth aspect, or the possible implementations of any one of the aspects is performed.

With reference to the thirteenth aspect, in a possible implementation, the memory is located outside the communication apparatus.

With reference to the thirteenth aspect, in a possible implementation, the memory is located in the communication apparatus.

In this application, the processor and the memory may alternatively be integrated into one component. In other words, the processor and the memory may alternatively be integrated together.

With reference to the thirteenth aspect, in a possible implementation, the communication apparatus further includes a transceiver, and the transceiver is configured to receive a frame or send a frame.

According to a fourteenth aspect, this application provides a communication apparatus. The communication apparatus is an AP MLD, and the communication apparatus includes a processor, configured to perform the method in any one of the second aspect, the sixth aspect, and the tenth aspect, or the possible implementations of any one of the aspects. Alternatively, the processor is configured to execute a program stored in a memory. When the program is executed, the method in any one of the second aspect, the sixth aspect, and the tenth aspect, or the possible implementations of any one of the aspects is performed.

With reference to the fourteenth aspect, in a possible implementation, the memory is located outside the second communication apparatus.

With reference to the fourteenth aspect, in a possible implementation, the memory is located in the second communication apparatus.

In this application, the processor and the memory may alternatively be integrated into one component. In other words, the processor and the memory may alternatively be integrated together.

With reference to the fourteenth aspect, in a possible implementation, the communication apparatus further includes a transceiver, and the transceiver is configured to receive a frame or send a frame.

According to a fifteenth aspect, this application provides a communication apparatus. The communication apparatus includes a logic circuit and an interface, and the logic circuit is coupled to the interface.

In a design, the logic circuit is configured to generate a first association request frame. The interface is configured to output the first association request frame. The first association request frame includes a multi-link element, the multi-link element includes indication information, and the indication information indicates a second link. The interface is further configured to input a first association response frame. The first association response frame includes a first status code field and a multi-link element, the multi-link element of the first association response frame includes a second status code field, a value of the first status code field is not 0, to indicate that the first link is not accepted, and the second status code field is set to a first value that is not 0, to indicate that a cause why the second link is not accepted is that the first link is not accepted.

In a design, the logic circuit is configured to generate a first association request frame. The interface is configured to output the first association request frame. The first association request frame includes a multi-link element, the multi-link element includes indication information, and the indication information indicates a second link. The interface is further configured to input a first association response frame. The first association response frame includes a first status code field and a multi-link element, the multi-link element of the first association response frame includes a second status code field, and a value of the first status code field is not 0 and a value of the second status code field is 0, to jointly indicate that a cause why the second link is not accepted is that the first link is not accepted.

In a design, the logic circuit is configured to generate a first association request frame. The interface is configured to output the first association request frame. The first association request frame includes a multi-link element, the multi-link element includes indication information, and the indication information indicates a second link. The interface is further configured to input a first association response frame. The first association response frame includes a first status code field and a multi-link element, and the first status code field is set to a second value that is not 0, to indicate that multi-link setup between the non-AP MLD and AP MLD fails, and that if the association request frame is transmitted on another requested link, multi-link setup may succeed. The multi-link element of the first association response frame includes a second status code field, to indicate a cause why the second link is accepted or not accepted.

According to a sixteenth aspect, this application provides another communication apparatus. The communication apparatus includes a logic circuit and an interface, and the logic circuit is coupled to the interface.

In a design, the interface is configured to input a first association request frame. The first association request frame includes a multi-link element, the multi-link element includes indication information, and the indication information indicates a second link. The logic circuit is configured to generate a first association response frame. The interface is configured to output the first association response frame. The first association response frame includes a first status code field and a multi-link element, the multi-link element of the first association response frame includes a second status code field, a value of the first status code field is not 0, to indicate that the first link is not accepted, and the second status code field is set to a first value that is not 0, to indicate that a cause why the second link is not accepted is that the first link is not accepted.

In a design, the interface is configured to input a first association request frame. The first association request frame includes a multi-link element, the multi-link element includes indication information, and the indication information indicates a second link. The logic circuit is configured to generate a first association response frame. The interface is configured to output the first association response frame. The first association response frame includes a first status code field and a multi-link element, the multi-link element of the first association response frame includes a second status code field, and a value of the first status code field is not 0 and a value of the second status code field is 0, to jointly indicate that a cause why the second link is not accepted is that the first link is not accepted.

In a design, the interface is configured to input a first association request frame. The first association request frame includes a multi-link element, the multi-link element includes indication information, and the indication information indicates a second link. The logic circuit is configured to generate a first association response frame. The interface is configured to output the first association response frame. The first association response frame includes a first status code field and a multi-link element, and the first status code field is set to a second value that is not 0, to indicate that multi-link setup between the non-AP MLD and AP MLD fails, and that if the association request frame is transmitted on another requested link, multi-link setup may succeed. The multi-link element of the first association response frame includes a second status code field, to indicate a cause why the second link is accepted or not accepted.

According to a seventeenth aspect, an embodiment of this application provides a computer-readable storage medium. The computer-readable storage medium is configured to store a computer program; and when the computer program is run on a computer, the method in any one of the first aspect, the fifth aspect, and the ninth aspect, or the possible implementations of any one of the aspects is performed.

According to an eighteenth aspect, an embodiment of this application provides a computer-readable storage medium. The computer-readable storage medium is configured to store a computer program; and when the computer program is run on a computer, the method in any one of the second aspect, the sixth aspect, and the tenth aspect, or the possible implementations of any one of the aspects is performed.

According to a nineteenth aspect, an embodiment of this application provides a computer program product. The computer program product includes a computer program or computer code; and when the computer program product runs on a computer, the method in any one of the first aspect, the fifth aspect, and the ninth aspect, or the possible implementations of any one of the aspects is performed.

According to a twentieth aspect, an embodiment of this application provides a computer program product. The computer program product includes a computer program or computer code; and when the computer program product runs on a computer, the method in any one of the second aspect, the sixth aspect, and the tenth aspect, or the possible implementations of any one of the aspects is performed.

According to a twenty-first aspect, an embodiment of this application provides a computer program. When the computer program is run on a computer, the method in any one of the first aspect, the fifth aspect, and the ninth aspect, or the possible implementations of any one of the aspects is performed.

According to a twenty-second aspect, an embodiment of this application provides a computer program. When the computer program is run on a computer, the method in any one of the second aspect, the sixth aspect, and the tenth aspect, or the possible implementations of any one of the aspects is performed.

According to a twenty-third aspect, an embodiment of this application provides a wireless communication system, and the wireless communication system includes a non-AP MLD and an AP MLD. The non-AP MLD is configured to perform the method in any one of the first aspect, the fifth aspect, and the ninth aspect, or the possible implementations of any one of the aspects is performed. The AP MLD is configured to perform the method in any one of the second aspect, the sixth aspect, and the tenth aspect, or the possible implementations of any one of the aspects is performed.

In this embodiment of this application, when one or more other links in the non-AP MLD can be accepted (or successfully set up), but the one or more other links cannot be accepted because a link, in the non-AP MLD, for transmitting the association request frame is not accepted (or fails to be set up), a status code field of the association response frame is used to notify the non-AP MLD that a cause why the one or more other links are not accepted is that the link for transmitting the association request frame is not accepted. In other words, in this embodiment of this application, the status code field of the association response frame is used to notify the non-AP MLD that if the association request frame is sent on the one or more other links, the one or more other links may be accepted (or successfully set up). Therefore, the non-AP MLD may send the association request frame on the one or more other links for multi-link setup, to improve a probability that multi-link setup succeeds. In addition, the non-AP MLD does not need to attempt to set up multi-link communication on each link, to reduce a quantity of attempts, and improve efficiency of multi-link setup.

BRIEF DESCRIPTION OF DRAWINGS

To describe the technical solutions in embodiments of this application more clearly, the following briefly describes the accompanying drawings used for describing embodiments.

DESCRIPTION OF EMBODIMENTS

Figure 1:
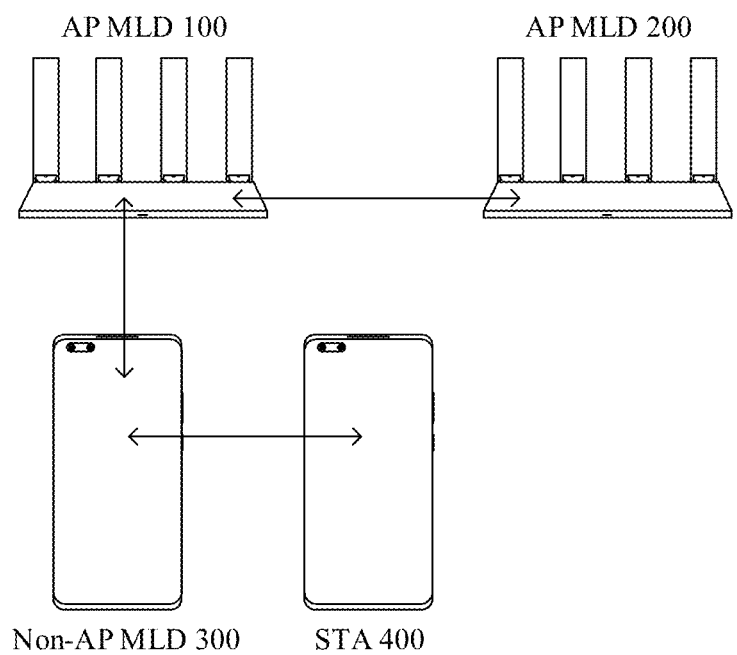
FIG. 1 is a schematic diagram of an architecture of a wireless communication system according to an embodiment of this application.

The following clearly and completely describes the technical solutions in embodiments of this application with reference to the accompanying drawings in embodiments of this application.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c. a, b, and c each may be singular or plural.

In descriptions of this application, the terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described by using "example" or "for example" in this application shall not be construed as being more preferred or having more advantages than another embodiment or design scheme. Exactly, use of the word "example", "in an example", "for example", or the like is intended to present a related concept in a specific manner.

In this application, an element represented in a singular form is intended to represent "one or more", but does not represent "one and only one", unless otherwise specified.

A multi-link device may include a plurality of logical stations, and each of the logical stations operates on a link (link), but a plurality of logical stations are allowed to operate on a same link. During data transmission between an AP MLD and a non-AP MLD, a link identifier may be used to identify a link or a station on a link. Before communication, the AP MLD and the non-AP MLD may first negotiate or communicate for a correspondence between a link identifier and a link or a station on a link. Therefore, during data transmission, the link identifier is carried without transmitting a large amount of signaling information to indicate the link or the station on the link. This reduces signaling overheads and improves transmission efficiency.

Optionally, the multi-link device may implement wireless communication in compliance with the 802.11 series protocols. For example, a station in compliance with extremely high throughput (extremely high throughput, EHT), a station in compliance with 802.11be, or a station in compatible with 802.11be implements communication with another device. It is clear that the another device may be a multi-link device, or may not be a multi-link device.

The method provided in this application may be applied to a wireless local area network (wireless local area network, WLAN) system, for example, Wi-Fi. The method provided in this application is applicable to the Institute of Electrical and Electronics Engineers (institute of electrical and electronics engineers, IEEE) 802.11 series protocols, for example, the next-generation Wi-Fi protocol of 802.11ax, for example, 802.11be, Wi-Fi 7, or extremely high throughput (extremely high throughput, EHT), and a next-generation of 802.11be: Wi-Fi 8. Other cases are not enumerated. The method provided in this application may further be applied to an ultra wide band (ultra wide band, UWB)-based wireless personal area network system or a sensing system.

Although this application is mainly described by using a network in which the IEEE 802.11 is deployed as an example, a person skilled in the art easily understands that various aspects of this application can be expanded to other networks that use various standards or protocols, for example, a high performance radio LAN (high performance radio LAN, HIPERLAN) (a wireless standard that is similar to the IEEE 802.11 standard, and is mainly used in Europe), a wide area network (wide area network, WAN), a wireless local area network (WLAN), a personal area network (personal area network, PAN), or another known or later developed network.

FIG. 1 is a schematic diagram of an architecture of a wireless communication system according to an embodiment of this application. As shown in FIG. 1, the wireless communication system includes at least one AP MLD (for example, an AP MLD 100 and an AP MLD 200 in FIG. 1) and at least one non-AP MLD (for example, a non-AP MLD 300 in FIG. 1). Optionally, in FIG. 1, the wireless communication system may further include a conventional station (for example, a single-link non-AP STA 400 in FIG. 1, which is also referred to as a STA 400) that supports transmission only on a single link. The AP MLD is a device that provides a service for the non-AP MLD, and the non-AP MLD may communicate with the AP MLD on a plurality of links, to improve throughput. A STA in the non-AP MLD may also communicate with an AP in the AP MLD on a link. It may be understood that in FIG. 1, that the non-AP MLD is a mobile phone and the AP MLD is a router is used as an example, and does not limit types of the AP MLD and the non-AP MLD in this application. It may further be understood that a quantity of AP MLDs and a quantity of non-AP MLDs in FIG. 1 are merely an example, and there may be more or less AP MLDs or non-AP MLDs in the wireless communication system. This is not limited in this application.

In embodiments of this application, the term "communication" may also be described as "data transmission", "information transmission", or "transmission". The term "transmission" may generally mean sending and receiving.

Figure 2:
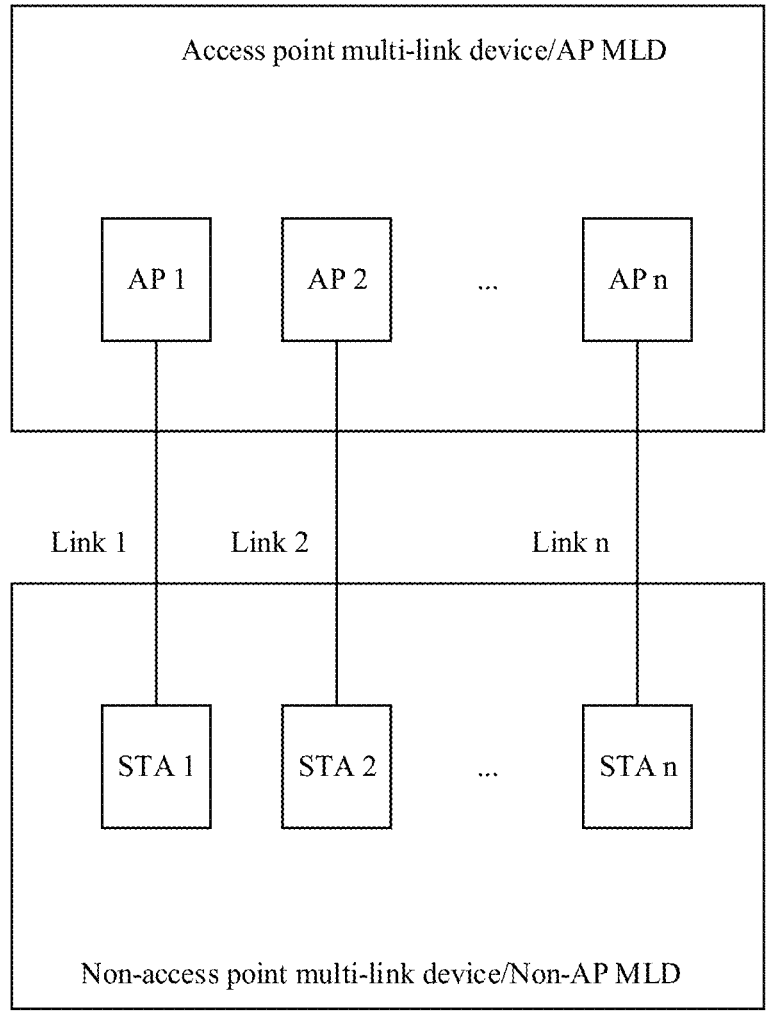
FIG. 2 is a schematic diagram of multi-link communication according to an embodiment of this application.

Optionally, FIG. 2 is a schematic diagram of multi-link communication according to an embodiment of this application. As shown in FIG. 2, an AP MLD includes n stations: an AP 1, an AP 2, . . . , and an AP n. A non-AP MLD also includes n stations: a STA 1, a STA 2, . . . , and a STA n. Communication between MLDs is multi-link communication. A link 1 to a link n in FIG. 2 form a multi-link. In other words, the AP MLD and the non-AP MLD may perform parallel communication on the link 1, a link 2, . . . , and the link n. An AP in the AP MLD may set up an association relationship with a STA in the non-AP MLD. For example, the STA 1 in the non-AP MLD sets up an association relationship with the AP 1 in the AP MLD. The STA 2 in the non-AP MLD sets up an association relationship with the AP 2 in the AP MLD. The STA n in the non-AP MLD sets up an association relationship with the AP n in the AP MLD.

Figure 3A:
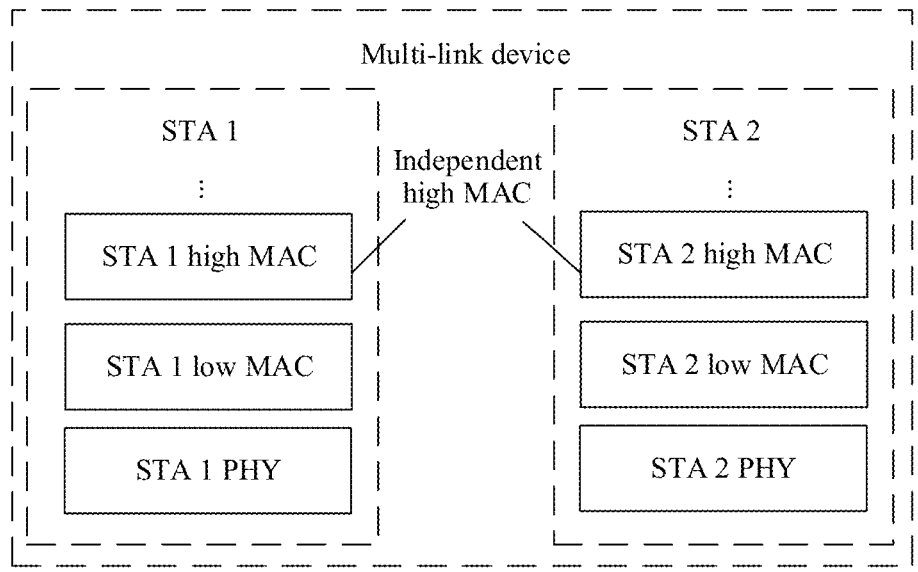
FIG. 3*a* is a schematic diagram of a structure of a multi-link device according to an embodiment of this application.
Figure 3B:
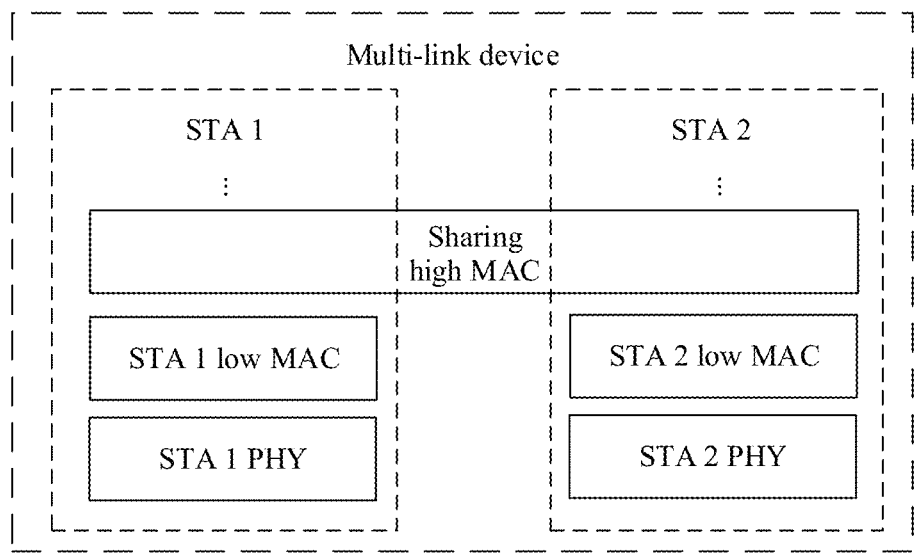
FIG. 3*b* is a schematic diagram of another structure of a multi-link device according to an embodiment of this application.

Optionally, FIG. 3a is a schematic diagram of a structure of a multi-link device according to an embodiment of this application. The 802.11 standard focuses on an 802.11 physical layer (physical layer, PHY) and a medium access control (medium access control, MAC) layer in a multi-link device. As shown in FIG. 3a, a plurality of STAs included in the multi-link device are independent of each other at a low MAC (low MAC) layer and a PHY layer, and are also independent of each other at a high MAC (high MAC) layer. FIG. 3b is a schematic diagram of another structure of a multi-link device according to an embodiment of this application. As shown in FIG. 3b, a plurality of STAs included in the multi-link device are independent of each other at a low MAC (low MAC) layer and a PHY layer, and share a high MAC (high MAC) layer. Certainly, in a multi-link communication process, a non-AP MLD may use a structure in which high MAC layers are independent of each other, and an AP MLD uses a structure in which high MAC layers are shared. Alternatively, a non-AP MLD may use a structure in which high MAC layers are shared, and an AP MLD use a structure in which high MAC layers are independent of each other. Alternatively, both a non-AP MLD and an AP MLD may use a structure in which high MAC layers are shared. Alternatively, a non-AP MLD and an AP MLD may both use a structure in which high MAC layers are independent of each other. A schematic diagram of an internal structure of the multi-link device is not limited in this embodiment of this application. FIG. 3a and FIG. 3b are merely examples for descriptions. For example, the high MAC layer or the low MAC layer may be implemented by one processor in a chip system of the multi-link device, or may be implemented by different processing modules in a chip system.

A frequency band in which the multi-link device operates may include one or more frequency bands of sub 1 GHz, 2.4 GHz, 5 GHz, 6 GHz, and high frequency 60 GHz.

For example, the multi-link device in this embodiment of this application may be a single-antenna device, or may be a multi-antenna device. For example, the multi-link device may be a device with more than two antennas. A quantity of antennas included in the multi-link device is not limited in embodiments of this application.

For example, a multi-link device (which may be a non-AP MLD or an AP MLD herein) is an apparatus having a wireless communication function. The apparatus may be an entire system device, or may be a chip, a processing system, or the like installed in an entire system device. A device in which the chip or the processing system is installed may implement the method and the functions in embodiments of this application under control of the chip or the processing system. For example, in embodiments of this application, a non-AP MLD has a wireless transceiver function, may support the 802.11 series protocols, and may communicate with an AP MLD, a single-link device, or another non-AP MLD. For example, the non-AP MLD is any user communication device that allows a user to communicate with an AP and communicate with a WLAN. For example, the non-AP MLD may be user equipment that can connect to a network, for example, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a mobile phone, an Internet of Things node in the Internet of Things, or a vehicle-mounted communication apparatus in the Internet of Vehicles. The non-AP MLD may alternatively be a chip and a processing system in the foregoing terminals. The AP MLD may be an apparatus that provides a service for the non-AP MLD, and may support the 802.11 series protocols. For example, the AP MLD may be a communication entity such as a communication server, a router, a switch, or a bridge; or the AP MLD may include a macro base station, a micro base station, a relay station, and the like in various forms. Certainly, the AP MLD may alternatively be a chip and a processing system in the devices in various forms. In this way, the method and the functions in embodiments of this application are implemented. The 802.11 protocols may be a protocol that supports the 802.11be or is compatible with the 802.11be.

It may be understood that the multi-link device may support high-rate and low-latency transmission. With continuous evolution of application scenarios of a wireless local area network, the multi-link device may be further used in more scenarios, for example, a sensor node (for example, a smart meter, a smart electricity meter, and a smart air detection node) in a smart city, a smart device (for example, a smart camera, a projector, a display, a television, a stereo, a refrigerator, and a washing machine) in a smart home, a node in the Internet of Things, an entertainment terminal (for example, AR, VR, or other wearable devices), a smart device (for example, a printer and a projector) in a smart office, an Internet of Vehicles device in the Internet of Vehicles, and some infrastructures (a vending machine, a self-service navigation station of a supermarket, a self-service cash register device, and a self-service ordering machine) in daily life scenarios. Specific forms of the non-AP MLD and the AP MLD are not limited in embodiments of this application, and are merely examples for description herein.

This application provides a multi-link communication setup method and a related apparatus, to improve efficiency of multi-link setup (or multi-link association).

Usually, a non-AP MLD may simultaneously set up association with a plurality of links in an AP MLD by performing multi-link setup (multi-link setup) on one link (link). A multi-link setup (multi-link setup) process is as follows: The non-AP MLD sends, on a link (for ease of description, the link is denoted as a first link), an association request frame that carries a multi-link element (Multi-link element, MLE). The multi-link element carries information about another link, to request to set up multi-link communication with the AP MLD. After receiving the association request frame, the AP MLD returns, on the first link, an association response frame that carries a multi-link element to the non-AP MLD, to notify the non-AP MLD whether multi-link communication setup succeeds.

Usually, if the link (namely, the first link), in the non-AP MLD, for transmitting the association request frame is not accepted (or the first link fails to be set up), another link in the non-AP MLD cannot be accepted (or the another link fails to be set up). However, causes why links are accepted or not accepted (or why the link is successfully set up or fails to be set up) may be different. For example, load of different links may be different. If load of a link is heavy, the link may not be accepted (or the link fails to be set up). For example, capabilities of the non-AP MLD on different links may be different. If a capability of the non-AP MLD on a link is weak, the link may not be accepted (or the link fails to be set up). Consequently, the following case may occur: When the link (namely, the first link), in the non-AP MLD, for transmitting the association request frame is not accepted (or fails to be set up), one or more other links may be accepted (or successfully set up). However, because the first link is not accepted (or fails to be set up), the one or more other links cannot be accepted (or fails to be set up). Therefore, when the link, in the non-AP MLD, for transmitting the association request frame is not accepted (or fails to be set up), the non-AP MLD does not know whether multi-link communication with the AP MLD can be successfully set up if the association request frame is sent on another link. Consequently, the non-AP MLD can only send an association request frame on each link to attempt to set up multi-link communication, which causes low efficiency of multi-link setup.

However, in this embodiment of this application, when the one or more other links in the non-AP MLD can be accepted (or successfully set up), but the one or more other links cannot be accepted because the link for transmitting the association request frame is not accepted (or fails to be set up), a status code field of the association response frame is used to notify the non-AP MLD that a cause why the one or more other links are not accepted is that the link for transmitting the association request frame is not accepted. In other words, in this embodiment of this application, the status code field of the association response frame is used to notify the non-AP MLD that if the association request frame is sent on the one or more other links, the one or more other links may be accepted (or successfully set up). Therefore, the non-AP MLD may send the association request frame on the one or more other links for multi-link setup, to improve a probability that multi-link setup succeeds. In addition, the non-AP MLD does not need to attempt to set up multi-link communication on each link, to reduce a quantity of attempts, and improve efficiency of multi-link setup.

It may be understood that, because the association request frame and the association response frame are transmitted on a same link, the "link for transmitting the association request frame" mentioned in this application is also a "link for transmitting the association response frame". The "another link" mentioned in this application is a link, in the non-AP MLD, other than the "link for transmitting the association request frame".

The following describes in detail the technical solutions provided in this application with reference to more accompanying drawings.

To clearly describe the technical solutions in this application, this application is described by using a plurality of embodiments. For details, refer to the following. In this application, unless otherwise specified, for same or similar parts of embodiments or implementations, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application are not intended to limit the protection scope of this application.

Embodiment 1

Embodiment 1 of this application mainly describes a case in which a value of a status code (Status Code) field of a multi-link element (multi-link element, MLE) is extended, to indicate that a cause why a link (the link is not a link for transmitting an association request frame) in a non-AP MLD is not accepted is that the link, in the non-AP MLD, for transmitting the association request frame is not accepted.

Figure 4:
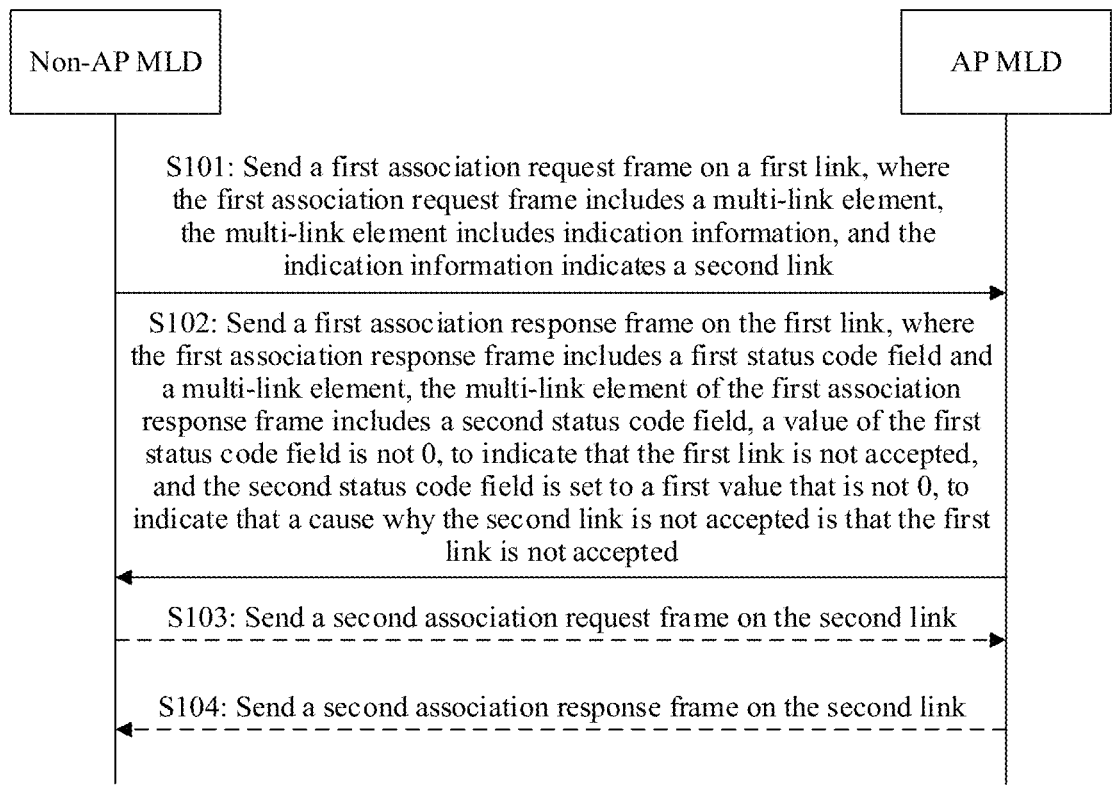
FIG. 4 is a schematic flowchart of a multi-link communication setup method according to an embodiment of this application.

FIG. 4 is a schematic flowchart of a multi-link communication setup method according to an embodiment of this application. As shown in FIG. 4, the multi-link communication setup method includes but is not limited to the following steps.

S101: A first station of a non-AP MLD sends a first association request frame on a first link, where the first association request frame includes a multi-link element, the multi-link element includes indication information, and the indication information indicates a second link.

Correspondingly, a first access point of an AP MLD receives the first association request frame on the first link.

In this embodiment of this application, the non-AP MLD has at least two links, and the AP MLD also has at least two links. It may be understood that a quantity of links in the non-AP MLD may be equal to or may not be equal to a quantity of links in the AP MLD. This is not limited in this embodiment of this application.

Optionally, the first station is any station in the non-AP MLD, and the first link is a link on which the first station operates. To be specific, a station (namely, the first station in this embodiment of this application) of the non-AP MLD may send an association request frame (namely, the first association request frame in this embodiment of this application) on a link (namely, the first link in this embodiment of this application). The association request frame carries the multi-link element (multi-link element, MLE), and the multi-link element carries information about another link (a second link in the following), to request to set up multi-link communication with the AP MLD. For a specific frame format and a function of the first association request frame, refer to descriptions in an existing standard. Details are not described in this embodiment of this application.

Optionally, the multi-link element included in the first association request frame carries the indication information, and the indication information indicates the second link. The second link is a link other than the first link in the non-AP MLD, namely, the another link. It may be understood that the second link is a link in links on which the non-AP MLD performs multi-link setup with the AP MLD other than the first link. For example, the non-AP MLD has three links: a link 1, a link 2, and a link 3. If the non-AP MLD performs multi-link setup (or multi-link communication setup) with the AP MLD on the link 1 and the link 3, and the non-AP MLD sends the association request frame on the link 1, the link 1 is the first link, and the link 3 is the second link. For another example, the non-AP MLD has three links: a link 1, a link 2, and a link 3. If the non-AP MLD performs multi-link setup (or multi-link communication setup) with the AP MLD on the link 1, the link 2, and the link 3, and the non-AP MLD sends the association request frame on the link 1, the link 1 is the first link, and both the link 2 and the link 3 are second links.

Optionally, the indication information is carried in a STA control (STA control) field of a per-STA profile subelement (per-STA profile subelement) of the multi-link element. For example, the indication information may be a link identifier (link ID) subfield of the STA control field. It may be understood that one link identifier (link ID) subfield is used to identify one second link. It may further be understood that, for a value and a meaning of the link identifier (link ID) subfield, refer to a meaning in an existing standard. Details are not described herein.

Figure 5:
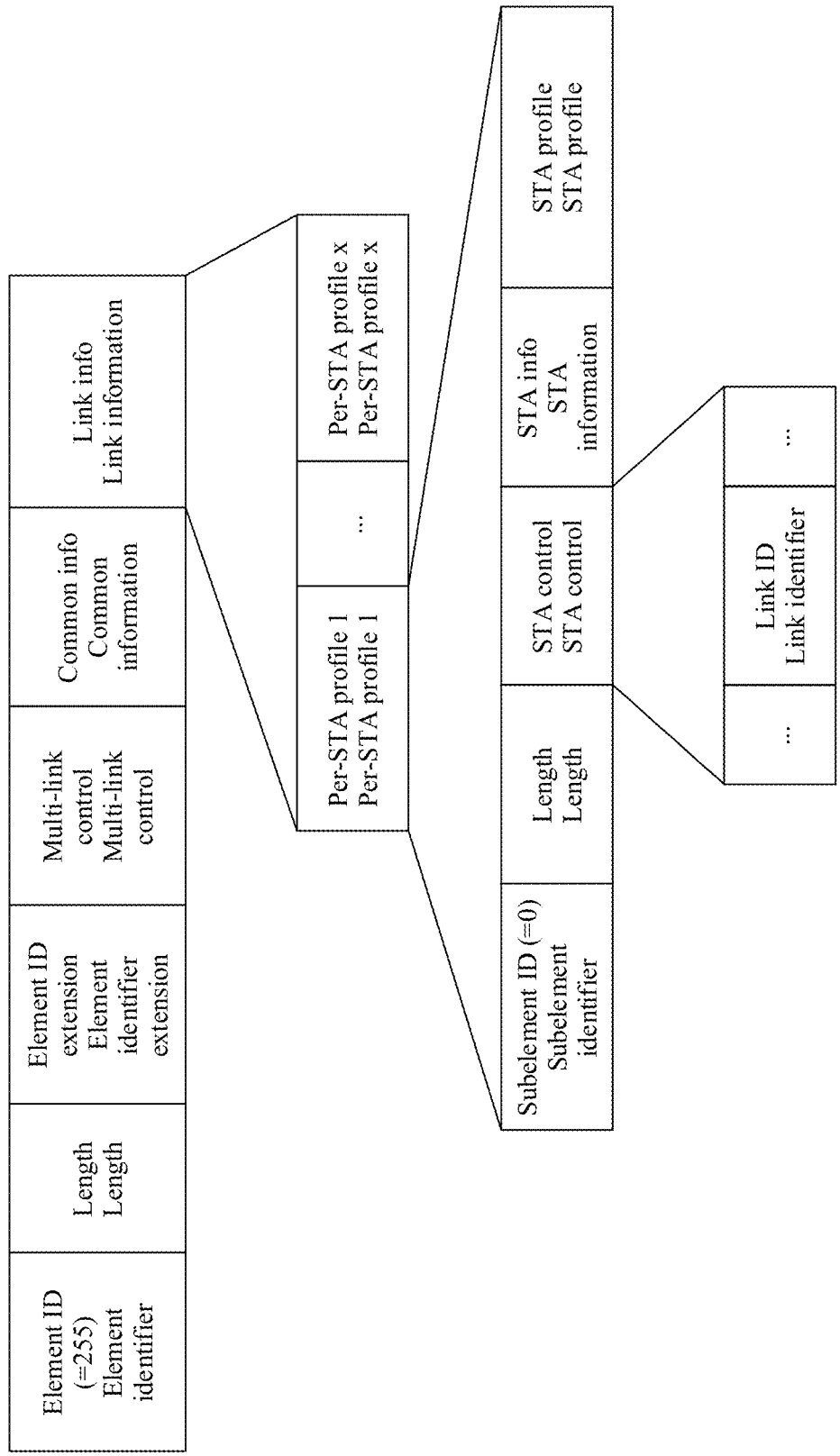
FIG. 5 is a schematic diagram of a frame format of a multi-link element according to an embodiment of this application.

FIG. 5 is a schematic diagram of a frame format of the multi-link element according to an embodiment of this application. As shown in FIG. 5, the multi-link element includes but is not limited to a multi-link control (Multi-Link Control) field, a common information (Common Info) field, and a link information (Link Info) field. The multi-link control field carries a type of the multi-link element and indication information indicating a field that exists and a field that does not exist in the common information field. The common information field carries information (which is MLD-level information, namely, MLD-level info) about a multi-link device and common information of a plurality of stations of the multi-link device. The link information field carries information about a station on each link in the multi-link device. It may be understood that, for a specific meaning of each field of the multi-link element, refer to descriptions in an existing standard. Details are not described herein. It may further be understood that FIG. 5 shows only some fields of the multi-link element. For a specific frame format of the multi-link element, refer to descriptions in an existing standard. Details are not described herein.

As shown in FIG. 5, the link information field includes one or more per-STA profile subelements (per-STA profile subelement). One per-STA profile subelement carries information about a station on a link. The per-STA profile subelement includes a STA control (STA Control) field, and the STA control field includes a link identifier (link ID) subfield. The link identifier subfield specifies a value that uniquely identifies a link on which a reported STA operates (The Link ID subfield specifies a value that uniquely identifies the link where the reported STA is operating on). In other words, the link identifier subfield indicates a link. It may be understood that the reported STA in this application is a STA operating on the second link.

It may be understood that, if the multi-link element carried in the association request frame includes a plurality of per-STA profile subelements, there are a plurality of link identifier subfields, in other words, there are a plurality of second links.

S102: The first access point of the AP MLD sends a first association response frame on the first link, where the first association response frame includes a first status code field and a multi-link element, the multi-link element of the first association response frame includes a second status code field, a value of the first status code field is not 0, to indicate that the first link is not accepted, and the second status code field is set to a first value that is not 0, to indicate that a cause why the second link is not accepted is that the first link is not accepted.

Correspondingly, the first station of the non-AP MLD receives the first association response frame on the first link. The first station of the non-AP MLD may learn, from the first status code field and the second status code field of the first association response frame, information about whether the first link is accepted (or whether multi-link communication setup succeeds, or whether multi-link setup succeeds), and whether the second link is accepted (including the cause why the second link is not accepted).

Optionally, the first access point is an access point, in the AP MLD, operating on the first link.

Optionally, the first status code field may indicate whether the first link (or a link for transmitting the first association request frame) is accepted, whether the first link is successfully set up, or whether the first link becomes a link in multi-link communication. If the first link is accepted (if the link is accepted), the first status code field may indicate success. If the first link is not accepted, the first status code field may indicate a failure cause (the Status Code field in the core frame or frame body or not in the multi-link element of the Association Response frame shall indicate SUCCESS if the link is accepted or the failure cause if the link is not accepted). When the first status code field is set to 0, it indicates success (SUCCESS), that is, the first link is accepted. In other words, when a value of the first status code field is not 0, it indicates that the first link is not accepted or indicates a cause why the first link is not accepted. Specifically, for a value and a meaning of the first status code, refer to an existing standard. Details are not described herein.

It may be understood that "not accepted" and "cannot be accepted" in this application have a same meaning, for example, meaning not being accepted, not being successfully set up, not becoming a link in multi-link communication, or another same or similar meaning.

Optionally, if the first link is accepted (if the link is accepted), multi-link setup (multi-link setup) between the non-AP MLD and the AP MLD may succeed, or multi-link communication between the non-AP MLD and the AP MLD may be successfully set up. However, if the first link is not accepted (if the link is not accepted), multi-link setup (multi-link setup) between the non-AP MLD and the AP MLD fails, or multi-link communication between the non-AP MLD and the AP MLD fails to be set up. When the first status code field indicates that the first link is not accepted, or when the first status code field indicates the cause why the first link is not accepted, the first status code field also indicates that multi-link setup between the non-AP MLD and the AP MLD fails, or that multi-link communication between the non-AP MLD and the AP MLD fails to be set up. In other words, when the value of the first status code field is not 0, it may indicate that the first link is not accepted or the cause why the first link is not accepted, and may further indicate that multi-link setup between the non-AP MLD and the AP MLD fails, or that multi-link communication between the non-AP MLD and the AP MLD fails to be set up.

Optionally, the second status code field may indicate whether the second link is accepted, whether the second link is successfully set up, or whether the second link becomes a link in multi-link communication. If the second link is accepted, the second status code field may indicate success. If the second link is not accepted, the second status code field may indicate a failure cause (the Status Code field included in the STA Profile subfield of the Per-STA Profile subelement shall indicate SUCCESS if the link is accepted or the failure cause if the link is not accepted). When the second status code field is set to 0, it indicates success (SUCCESS), that is, the second link is accepted. In other words, when a value of the second status code field is not 0, it indicates that the second link is not accepted or indicates the cause why the second link is not accepted.

Optionally, the first value that is not 0 is newly defined in this embodiment of this application, as shown in Table 1. When the second status code field is set to the first value, the second status code field indicates that the cause why the second link is not accepted is that the first link is not accepted, or indicates that the cause why the second link is not accepted is only that the first link is not accepted. In other words, when the second status code field is set to the first value, it indicates that if the non-AP MLD sends the association request frame on the second link, the second link can be successfully set up. The value of the first status code field cannot be the first value in this embodiment of this application. In other words, only the second status code field can be the first value.

The first value may be a value that is not used or is not defined in an existing status code (Status Code) field. For example, it is assumed that a length of the status code field is n bits, and the first value may be any value from 0 to $(2^n-1)$ other than an existing value. For example, n is equal to 16. The existing value includes 0 to 135, or a value from 0 to 135 other than a reserved value (4, 8, 9, 20, 21, 26, 29, 36, 48, 66, 69 to 71, 90, 91, 114, 115, 127). For example, the first value is any value from 0 to $(2^{16}-1)$ other than 0 to 135, for example, 136, 137, 138, or 139. For another example, the first value is any reserved value from 0 to 135, for example, any value in 4, 8, 9, 20, 21, 26, 29, 36, 48, 66, 69 to 71, 90, 91, 114, 115, or 127.

TABLE 1

| Status code (second status code) | Name (name) | Meaning (meaning) |
|---|---|---|
| . . . | . . . | . . . |
| First value | DENIED_TRANSMITTING_LINK_NOT_ACCEPTED | A link is not accepted because a transmitted link is not accepted (Link not accepted because the transmitting link is not accepted) |
| . . . | . . . | . . . |

It should be understood that, in this application, a link on which an association request/response (association request/response) frame is exchanged may be referred to as a transmitted link (transmitted link), and correspondingly, another link is referred to as a non-transmitted link (Non-transmitted link). Therefore, in step S101 and step S102, the first link is a transmitted link, and the second link is a non-transmitted link. A meaning indicated when the second status code field is set to the first value may also be described as follows: A cause why a non-transmitted link (Non-transmitted link) is not accepted is that a transmitted link (transmitted link) is not accepted.

Optionally, the first status code field may be located in a frame body (frame body) of the association response frame. For example, the first status code field may be located outside the multi-link element of the association response frame. In other words, the first status code field is not in the multi-link element of the association response frame (the Status Code field not in the multi-link element of the Association Response frame), or the first status code field is located in a core frame of the association response frame (the Status Code field in the core frame of the Association Response frame). The core frame may be content, in the association response frame, other than the multi-link element (MLE). The second status code field may be located in the multi-link element of the association response frame. For example, the second status code field is a status code field included in a STA profile (STA profile) field of a per-STA profile subelement (per-STA profile subelement) (the Status Code field included in the STA Profile subfield of the Per-STA Profile subelement).

Figure 6:
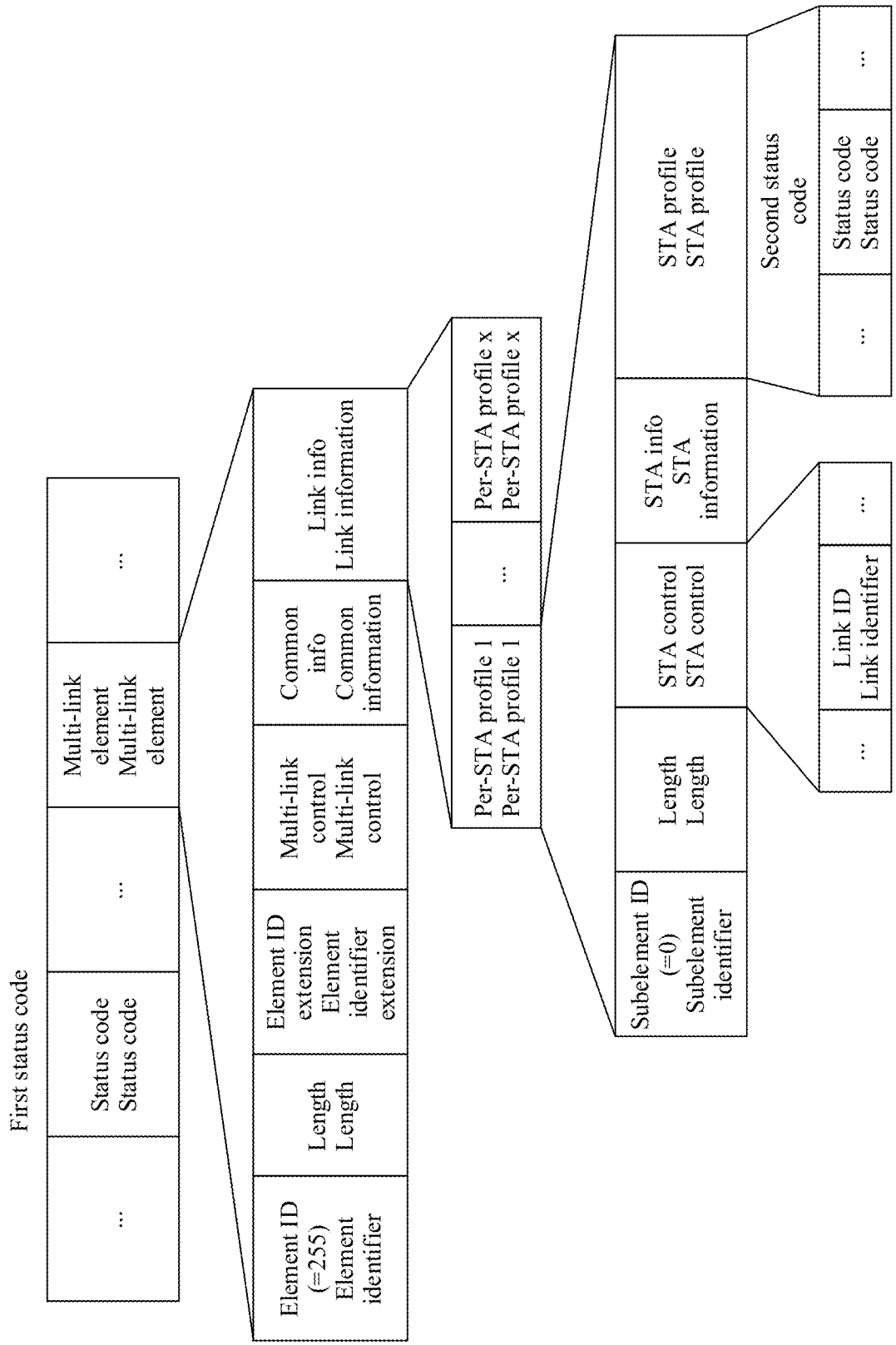
FIG. 6 is a schematic diagram of a frame format of an association response frame according to an embodiment of this application.

FIG. 6 is a schematic diagram of a frame format of the association response frame according to an embodiment of this application. As shown in FIG. 6, the association response frame includes but is not limited to a status code (Status Code) field (namely, the first status code field) and a multi-link element (MLE). The multi-link element includes but is not limited to a multi-link control (Multi-Link Control) field, a common information (Common Info) field, and a link information (Link Info) field. The link information (Link Info) field includes one or more per-STA profile subelements (per-STA profile subelement). The per-STA profile subelement includes but is not limited to a STA control (STA Control) field and a STA profile (STA Profile) field. The STA control field includes a link identifier (link ID) subfield, and the link identifier subfield indicates the second link (or a non-transmitted link). The STA profile field includes a status code (Status Code) field (namely, the second status code field) that indicates whether a link indicated by the link ID subfield is accepted. It may be understood that FIG. 6 shows only some fields of the association response frame. For a specific frame format of the association response frame, refer to descriptions in an existing standard. Details are not described herein. It may further be understood that for a specific meaning of each field of the association response frame, refer to descriptions in an existing standard. Details are not described herein.

Optionally, in this embodiment of this application, the multi-link element of the first association response frame includes one or more second status code fields, and one second status code field indicates whether one non-transmitted link is accepted. When a non-transmitted link in the non-AP MLD can be accepted (or successfully set up), but the non-transmitted link cannot be accepted because a transmitted link is not accepted (or fails to be set up), the AP MLD may set a second status code field corresponding to the non-transmitted link to the first value, to indicate that the non-transmitted link is not accepted because the transmitted link is not accepted, or to notify the non-AP MLD that if the non-AP MLD sends an association request frame on the non-transmitted link, the non-transmitted link can be accepted (or successfully set up). It may be understood that, when the second status code field is set to the first value, to indicate that a cause why the second link is not accepted is that the first link is not accepted, the value of the first status code field needs to be set to a value that is not 0.

In this embodiment of this application, when one or more non-transmitted links in the non-AP MLD can be accepted (or successfully set up), but the one or more non-transmitted links cannot be accepted because the transmitted link is not accepted (or fails to be set up), the value of the first status code field of the association response frame is not 0, and the second status code field (the Status Code field included in the STA Profile subfield of the Per-STA Profile subelement) of the multi-link element of the association response frame is set to a newly defined value (namely, the first value), to indicate that a cause why the one or more non-transmitted links are not accepted is that the transmitted link is not accepted. In other words, the second status code field is set to the first value, to notify the non-AP MLD that if the association request frame is sent on the one or more non-transmitted links, the one or more non-transmitted links may be accepted (or successfully set up). Therefore, according to this embodiment of this application, a probability that multi-link setup succeeds can be improved. In addition, the non-AP MLD does not need to attempt to set up multi-link communication on each link, to reduce a quantity of attempts, and improve efficiency of multi-link setup.

Optionally, in the first association response frame in this embodiment of this application, a value of at least one second status code field is the first value, to indicate that a cause why the at least one second link is not accepted is that the first link is not accepted. For ease of description, this embodiment of this application is described by using an example in which a value of one second status field of the first association response frame is the first value.

Optionally, after step S102, the multi-link communication setup method may further include one or more of the following steps:

S103: A second station of the non-AP MLD sends a second association request frame on a second link.

Correspondingly, a second access point of the AP MLD receives the second association request frame on the second link.

It may be understood that according to a definition (a link on which an association request/response frame is exchanged is referred to as a transmitted link) of a transmitted link (transmitted link), in a process from step S103 to step S104, the first link is no longer a transmitted link, and becomes a non-transmitted link. The second link herein is a transmitted link.

S104: The second access point of the AP MLD sends a second association response frame on the second link.

Correspondingly, the second station of the non-AP MLD receives the second association response frame on the second link.

Optionally, the value of the second status code field of the first association response frame is the first value. Therefore, the non-AP MLD may determine that a cause why the second link corresponding to the second status code field is not accepted is that the first link is not accepted; determine that a cause why the second link fails to be set up is only that the first link fails to be set up; or determine that if the non-AP MLD sends an association request frame on the second link, the second link can be successfully set up. Therefore, when the first link is not accepted (in other words, the value of the first status code field of the first association response frame is not 0), and a value of a second status code field of the first association response frame is the first value, the second station of the non-AP MLD may send the second association request frame on the second link corresponding to the second status code field, to request to set up association with the AP MLD at least on the second link. Correspondingly, after receiving the second association request frame on the second link, the second access point of the AP MLD returns the second association response frame on the second link, to notify whether association is successfully set up.

It may be understood that exchanging of the second association request frame and the second association response frame between the non-AP MLD and the AP MLD may be for multi-link setup or for association setup only on the second link. This is not limited in this embodiment of this application. In other words, whether the second association request frame and the second association response frame carry the multi-link element is not limited in this embodiment of this application. It may further be understood that, if exchanging of the second association request frame and the second association response frame between the non-AP MLD and the AP MLD is for multi-link setup, multi-link communication may not be set up on the first link. In other words, if the second association request frame carries the multi-link element, the multi-link element may not carry information about the first link. In a previous process of multi-link setup (for example, step S201 and step S202), the first link is not accepted (that is, fails to be set up). In this case, the second association request frame is sent on the second link for multi-link setup, and it is likely that the first link is still not accepted (that is, fails to be set up). Therefore, the multi-link element of the second association request frame does not carry the information about the first link (in this case, the first link is a non-transmitted link), to improve a probability that multi-link setup succeeds. It is clear that the information about the first link may alternatively be carried in the multi-link element of the second association request frame. Because compared with a case of the first link in the previous process of multi-link setup (for example, step S201 and step S202), a case of the first link may change, the first link may be accepted (that is, successfully set up).

In this embodiment of this application, the second status code field of the multi-link element of the association response frame is set to a newly defined value (namely, the first value), to notify the non-AP MLD that if the association request frame is sent on the link corresponding to the second status code field, the link can be accepted (or successfully set up). Therefore, the non-AP MLD can learn of links on which the association request frame is sent to successfully set up multi-link communication with a high probability. This can improve a probability that multi-link setup succeeds, reduce a quantity of attempts, and improve efficiency of multi-link setup.

Embodiment 2

Embodiment 2 of this application mainly describes a case in which a status code field (namely, a first status code field) outside a multi-link element of an association response frame and a status code field (namely, a second status code field) of the multi-link element jointly indicate that a cause why a link in a non-AP MLD is not accepted is that a link, in the non-AP MLD, for transmitting an association request frame is not accepted.

Figure 7:
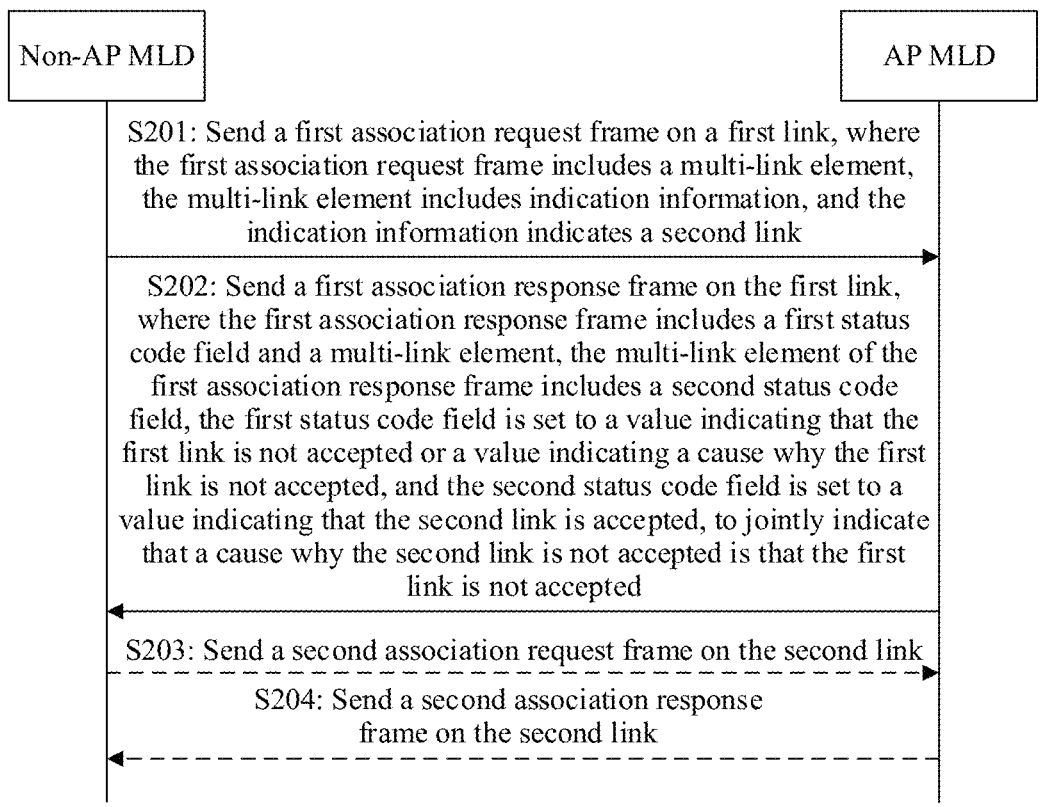
FIG. 7 is another schematic flowchart of a multi-link communication setup method according to an embodiment of this application.

FIG. 7 is another schematic flowchart of a multi-link communication setup method according to an embodiment of this application. As shown in FIG. 7, the multi-link communication setup method includes but is not limited to the following steps.

S201: A first station of a non-AP MLD sends a first association request frame on a first link, where the first association request frame includes a multi-link element, the multi-link element includes indication information, and the indication information indicates a second link.

Correspondingly, a first access point of an AP MLD receives the first association request frame on the first link.

For an implementation of step S201 in this embodiment of this application, refer to the implementation of step S101 in Embodiment 1. Details are not described herein again.

S202: The first access point of the AP MLD sends a first association response frame on the first link, where the first association response frame includes a first status code field and a multi-link element, the multi-link element of the first association response frame includes a second status code field, the first status code field is set to a value indicating that the first link is not accepted or a value indicating a cause why the first link is not accepted, and the second status code field is set to a value indicating that the second link is accepted, to jointly indicate that a cause why the second link is not accepted is that the first link is not accepted.

Correspondingly, the first station of the non-AP MLD receives the first association response frame on the first link. The first station of the non-AP MLD may determine, based on the value of the first status code field and the value of the second status code field of the first association response frame, that a cause why the second link is not accepted is that the first link is not accepted.

Optionally, the first access point is an access point, in the AP MLD, operating on the first link.

Optionally, the first status code field may indicate whether the first link (or a link for transmitting the first association request frame) is accepted, whether the first link is successfully set up, or whether the first link becomes a link in multi-link communication. For example, when the first status code field is set to 0, it indicates success (SUCCESS), that is, the first link is accepted. In other words, when the value of the first status code field is not 0, it indicates that the first link is not accepted or indicates the cause why the first link is not accepted. The second status code field may indicate whether the second link is accepted, whether the second link is successfully set up, or whether the second link becomes a link in multi-link communication. For example, when the second status code field is set to 0, it indicates success (SUCCESS), that is, the second link is accepted. In other words, when the value of the second status code field is not 0, it indicates that the second link is not accepted or indicates the cause why the second link is not accepted. That the first status code field is set to a value indicating that the first link is not accepted or a value indicating a cause why the first link is not accepted, and the second status code field is set to a value indicating that the second link is accepted, to jointly indicate that a cause why the second link is not accepted is that the first link is not accepted may alternatively be described as follows: The value of the first status code field is not 0 and the value of the second status code field is 0, to jointly indicate that the cause why the second link is not accepted is that the first link is not accepted.

Optionally, for a relationship between whether the first link is accepted and whether multi-link setup succeeds, refer to the related descriptions in Embodiment 1. Details are not described herein again.

Optionally, the first status code field may be located in a frame body (frame body) of the association response frame. For example, the first status code field may be located outside the multi-link element of the association response frame. In other words, the first status code field is not located in the multi-link element of the association response frame, or the first status code field is located in a core frame of the association response frame, and the core frame may be content, in the association response frame, other than the multi-link element (MLE). The second status code field may be located in the multi-link element of the association response frame. For example, the second status code field is a status code field included in a STA profile (STA profile) field of a per-STA profile subelement (per-STA profile subelement). For a frame format of the association response frame, refer to FIG. 6. Details are not described herein again.

Optionally, in this embodiment of this application, the multi-link element of the first association response frame includes one or more second status code fields, and one second status code field indicates whether one non-transmitted link is accepted. When a non-transmitted link can be accepted (or successfully set up), but the non-transmitted link cannot be accepted because a transmitted link is not accepted (or fails to be set up), the AP MLD may set the first status code field to a value that is not 0, and set a second status code field corresponding to the non-transmitted link to 0, to jointly indicate that a cause why the non-transmitted link is not accepted (or fails to be set up) is that the transmitted link is not accepted (or fails to be set up), to jointly indicate that a cause why the non-transmitted link is not accepted is only that the transmitted link is not accepted, or to notify the non-AP MLD that if the non-AP MLD sends an association request frame on the non-transmitted link, the non-transmitted link may be accepted (or successfully set up).

In other words, if the first status code field does not indicate success (that is, the first status code field indicates that the first link is not accepted or indicates a cause why the first link is not accepted, or the value of the first status code field is not 0), and the second status code field indicates success (that is, the second status code field indicates that the second link is accepted, or the value of the second status code field is 0), it indicates that a cause why the second link is not accepted is that the first link is not accepted.

In other words, if a non-transmitted link is accepted, a status code field (namely, the second status code field) included in a STA profile subfield of a per-STA profile subelement may indicate success. If a non-transmitted link is not accepted, a status code field indicates a failure cause. However, the following cases are excluded (the Status Code field included in the STA Profile subfield of the Per-STA Profile subelement shall indicate SUCCESS if the link is accepted or the failure cause if the link is not accepted with the exception below): If a cause why the link is not accepted is only that a transmitted link is not accepted, the status code field (namely, the second status code field) of the STA profile subfield of the per-STA profile subelement corresponding to the link may indicate success (The Status Code field included in the STA Profile subfield of the Per-STA Profile subelement shall indicate SUCCESS if the link is not accepted only because the transmitting link is not accepted).

Alternatively, when a status code field (namely, the first status code field) outside the multi-link element of the association response frame does not indicate success, and a status code field (namely, the second status code field) of a STA profile subfield of a per-STA profile subelement corresponding to the second link indicates success, the second link is not accepted. However, if the association request frame is sent on the second link, the second link may be accepted (When the Status Code field not in the multi-link element of the Association Response frame does not indicates SUCCESS, and the Status Code field included in the STA Profile subfield of the Per-STA Profile subelement indicates SUCCESS, the corresponding link is not accepted, but can be accepted if the Association Request frame is transmitted on that link).

In this embodiment of this application, a setting rule and a corresponding interpretation rule of the first status code field and the second status code field are designed. When the first status code field does not indicate success but the second status code field indicates success, it indicates that a cause why a link corresponding to the second status code field is not accepted is that the first link is not accepted. Therefore, the non-AP MLD learns that if the association request frame is sent on the link for multi-link setup, there is a high probability that multi-link setup succeeds. This can improve a probability that multi-link setup succeeds, reduce a quantity of attempts, and improve efficiency of multi-link setup.

Optionally, in this embodiment of this application, the value of the first status code field of the first association response frame is not 0, and a value of at least one second status code field is 0, to jointly indicate that a cause why the at least one second link is not accepted is that the first link is not accepted. For ease of description, this embodiment of this application is described by using an example in which a value of one second status field of the first association response frame is 0.

Optionally, after step S202, the multi-link communication setup method may further include the following steps.

S203: A second station of the non-AP MLD sends a second association request frame on the second link.

Correspondingly, a second access point of the AP MLD receives the second association request frame on the second link.

It may be understood that according to a definition (a link on which an association request/response frame is exchanged is referred to as a transmitted link) of a transmitted link (transmitted link), in a process from step S103 to step S104, the first link is no longer a transmitted link, and becomes a non-transmitted link. The second link herein is a transmitted link.

S204: The second access point of the AP MLD sends a second association response frame on the second link.

Correspondingly, the second station of the non-AP MLD receives the second association response frame on the second link.

For implementations of step S203 and step S204 in this embodiment of this application, refer to implementations of step S103 and step S104 in Embodiment 1. Details are not described herein again.

In this embodiment of this application, when one or more non-transmitted links in the non-AP MLD can be accepted (or successfully set up), but the one or more non-transmitted links cannot be accepted because the transmitted link is not accepted (or fails to be set up), the value of the first status code field of the association response frame is set to a value that is not 0, and the second status code field of the multi-link element of the association response frame is set to 0 (or set to indicate success), to jointly indicate that a cause why a non-transmitted link is not accepted is that the transmitted link is not accepted, or to notify the non-AP MLD that if the association request frame is sent on the non-transmitted link, the non-transmitted link may be accepted (or successfully set up). This can increase a probability that multi-link setup succeeds. In addition, the non-AP MLD does not need to attempt to set up multi-link communication on each link, to reduce quantity of attempts, and improve efficiency of multi-link setup. A new status code value does not need to be defined, to save overheads.

Embodiment 3

Embodiment 3 of this application mainly describes extending a value of a status code field (namely, a first status code field) outside a multi-link element of an association response frame, to indicate that multi-link setup fails. Further, a value of a status code field (namely, a second status code field) of the multi-link element may be set, to jointly indicate that a cause why a link corresponding to the second status code field is not accepted is that a transmitted link is not accepted.

Figure 8:
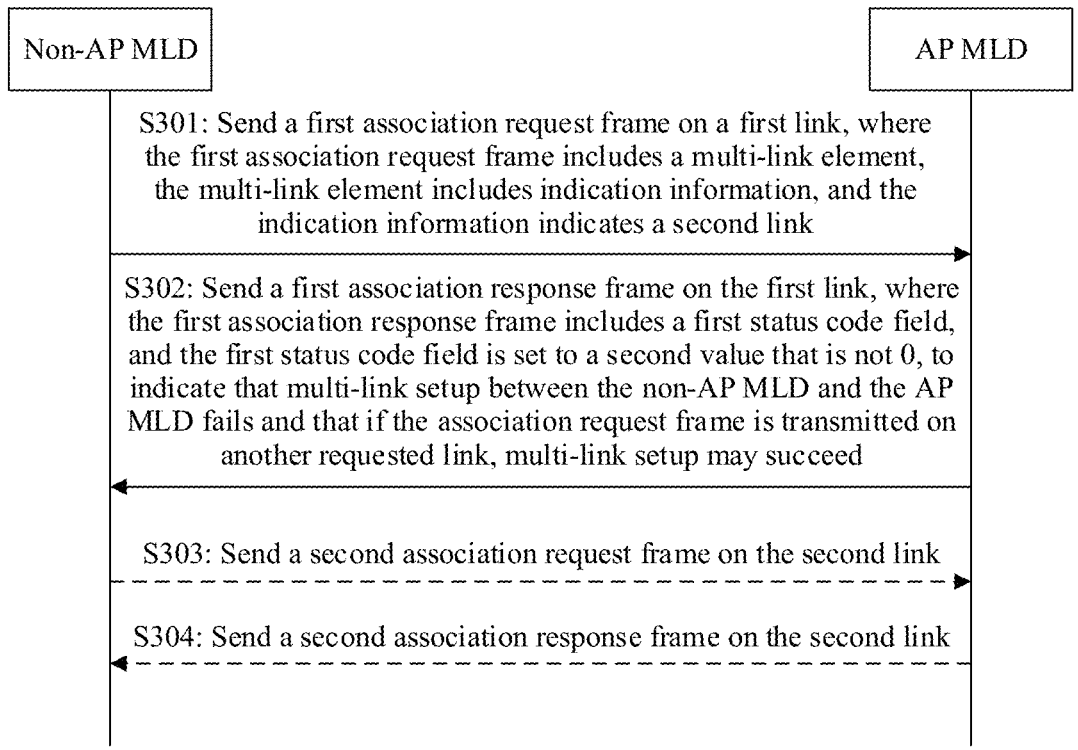
FIG. 8 is still another schematic flowchart of a multi-link communication setup method according to an embodiment of this application.

FIG. 8 is still another schematic flowchart of a multi-link communication setup method according to an embodiment of this application. As shown in FIG. 8, the multi-link communication setup method includes but is not limited to the following steps.

S301: A first station of a non-AP MLD sends a first association request frame on a first link, where the first association request frame includes a multi-link element, the multi-link element includes indication information, and the indication information indicates a second link.

Correspondingly, a first access point of an AP MLD receives the first association request frame on the first link.

As shown in Table 2, when the first status code field is set to the second value, the first status code field indicates that multi-link setup between the non-AP MLD and the AP MLD fails; or indicates that multi-link setup between the non-AP MLD and the AP MLD fails, and that if the association request frame is transmitted on another requested link (a link other than the first link), multi-link setup may succeed. A value of the second status code field cannot be the second value in this embodiment of this application. In other words, only the first status code field can be the second value.

TABLE 2

| Status code (first status code) | Name (name) | Meaning (meaning) |
|---|---|---|
| . . . | . . . | . . . |
| Second value | DENIED_TRANSMITTING_LINK_NOT_ACCEPTED | Multi-link setup fails (Multi-Link Setup is failed) |
|  | DENIED_OTHER_LINK_CAN_BE_ACCEPTED | Multi-link setup fails, but if an association request is transmitted on another requested link, multi-link setup may succeed (Multi-Link Setup is failed, but can be successful if the association request is transmitted on other requested links) |
| . . . | . . . | . . . |

For an implementation of step S301 in this embodiment of this application, refer to the implementation of step S101 in Embodiment 1. Details are not described herein again.

S302: The first access point of the AP MLD sends a first association response frame on the first link, where the first association response frame includes a first status code field, and the first status code field is set to a second value that is not 0, to indicate that multi-link setup between the non-AP MLD and the AP MLD fails and that if the association request frame is transmitted on another requested link, multi-link setup may succeed.

Correspondingly, the first station of the non-AP MLD receives the first association response frame on the first link.

Optionally, the first access point is an access point, in the AP MLD, operating on the first link.

Optionally, the first association response frame includes the first status code field and a multi-link element, the multi-link element of the first association response frame includes one or more second status code fields, and one second status code field indicates a cause why one link is accepted or not accepted. For a specific meaning of the second status code field, refer to the related descriptions in Embodiment 1. Details are not described herein again.

Optionally, a second value is newly defined in this embodiment of this application, and the second value is a value that is not used or not defined in an existing status code (Status Code) field. For example, if it is assumed that a length of the status code field is n bits, the second value may be any value from 0 to ($2^n-1$) other than an existing value. For example, n is equal to 16. The existing value includes but is not limited to 0 to 135, or a value from 0 to 135 other than a reserved value (4, 8, 9, 20, 21, 26, 29, 36, 48, 66, 69 to 71, 90, 91, 114, 115, 127). For example, the second value is any value from 0 to ($2^{16}-1$) other than 0 to 135, for example, 136, 137, 138, or 139. For another example, the second value is any reserved value from 0 to 135, for example, any value in 4, 8, 9, 20, 21, 26, 29, 36, 48, 66, 69 to 71, 90, 91, 114, 115, or 127. It may be understood that the second value in this embodiment of this application is different from the first value in Embodiment 1.

It should be understood that, when a value of the first status code field is an existing value (for example, 0 to 135), it indicates whether the first link (or a link for transmitting the first association request frame) is accepted, whether setup succeeds, or whether the first link becomes a link in multi-link communication. For details, refer to the related description in Embodiment 1. Details are not described herein again. When the value of the first status code field is the second value, it indicates that multi-link setup fails, or indicates that multi-link setup fails, but if the association request frame is transmitted on another requested link, multi-link setup may succeed.

In this embodiment of this application, the first status code field of the association response frame is set to a newly defined value (namely, the second value), to indicate that multi-link setup fails but one link exists, and when the association request frame is transmitted on the link, multi-link setup can succeed. Therefore, the non-AP MLD learns whether there is a probability that multi-link setup with the AP MLD succeeds, to avoid large power consumption of the non-AP MLD caused by continuous attempting of setting up multi-link communication by the non-AP MLD when a probability that multi-link setup succeeds is small.

Optionally, the first status code field may be located in a frame body (frame body) of the association response frame. For example, the first status code field may be located outside the multi-link element of the association response frame. In other words, the first status code field is not located in the multi-link element of the association response frame, or the first status code field is located in a core frame of the association response frame, where the core frame may be content, in the association response frame, other than the multi-link element (MLE). The second status code field may be located in the multi-link element of the association response frame. For example, the second status code field is a status code field included in a STA profile (STA profile) field of a per-STA profile subelement (per-STA profile subelement). For a frame format of the association response frame, refer to FIG. 6. Details are not described herein again.

Optionally, when a non-transmitted link can be accepted (or successfully set up), but the non-transmitted link cannot be accepted because multi-link setup fails (for example, a transmitted link is not accepted), the AP MLD may set the first status code field to the second value, and set a second status code field corresponding to the non-transmitted link to 0, to jointly indicate that multi-link setup fails, and that if the association request frame is transmitted on the non-transmitted link, multi-link setup may succeed; or to jointly indicate that a cause why the non-transmitted link is not accepted is that the transmitted link is not accepted (or multi-link setup fails).

In other words, if the first status code field is set to the second value, and the second status code field indicates success (in other words, the second status code field indicates that a second link is accepted, or the value of the second status code field is 0), it indicates that multi-link setup fails, and that if the association request frame is transmitted on the second link, multi-link setup may succeed; or indicates that a cause why the second link is not accepted is that the first link is not accepted (or multi-link setup fails).

Optionally, in the first association response frame in this embodiment of this application, the first status code field is set to the second value, and a value of at least one second status code field is 0, to jointly indicate that multi-link setup fails, and if the association request frame is transmitted on at least one second link corresponding to the at least one second status code field, multi-link setup may succeed. For ease of description, this embodiment of this application is described by using an example in which a value of one second status field of the first association response frame is 0.

Optionally, after step S302, the multi-link communication setup method may further include the following steps.

S303: A second station of the non-AP MLD sends a second association request frame on the second link.

Correspondingly, a second access point of the AP MLD receives the second association request frame on the second link.

It may be understood that according to a definition (a link on which an association request/response frame is exchanged is referred to as a transmitted link) of a transmitted link (transmitted link), in a process from step S103 to step S104, the first link is no longer a transmitted link, and becomes a non-transmitted link. The second link herein is a transmitted link.

S304: The second access point of the AP MLD sends a second association response frame on the second link.

Correspondingly, the second station of the non-AP MLD receives the second association response frame on the second link.

For implementations of step S303 and step S304 in this embodiment of this application, refer to implementations of step S303 and step S304 in Embodiment 1. Details are not described herein again.

In this embodiment of this application, the first status code field of the association response frame is set to the newly defined value (namely, the second value), and the second status code field of the multi-link element of the association response frame is set to 0 (or is set to indicate success), to jointly indicate that multi-link setup fails, and that if the association request frame is transmitted on the link corresponding to the second status code field, multi-link setup may succeed. Therefore, the non-AP MLD can learn of links on which the association request frame is sent to successfully set up multi-link communication. This can improve a probability that multi-link setup succeeds, reduce a quantity of attempts, and improve efficiency of multi-link setup.

The foregoing content describes in detail the methods provided in this application. To facilitate implementation of the foregoing solutions in embodiments of this application, embodiments of this application further provide corresponding apparatuses or devices.

In this application, the AP MLD and the non-AP MLD are divided into functional modules based on the method embodiments. For example, each functional module may be obtained through division based on a corresponding function, or two or more functions may be integrated into one processing module. The integrated module may be implemented in a form of hardware, or may be implemented in a form of a software functional module. It should be noted that, in this application, division into modules is an example, and is merely logical function division. In actual implementation, another division manner may be used. The following describes in detail the AP MLD and the non-AP MLD in embodiments of this application with reference to FIG. 9 to FIG. 11.

Figure 9:
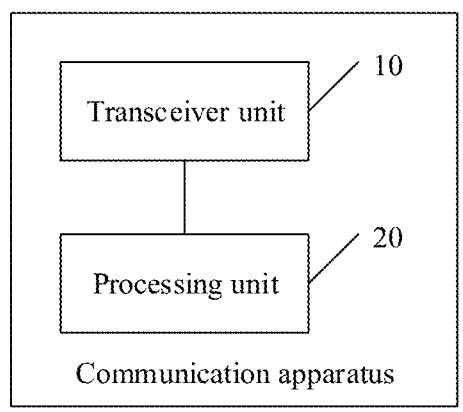
FIG. 9 is a schematic diagram of a structure of a communication apparatus according to an embodiment of this application.

FIG. 9 is a schematic diagram of a structure of a communication apparatus according to an embodiment of this application. As shown in FIG. 9, the communication apparatus includes a transceiver unit 10 and a processing unit 20.

In some embodiments of this application, the communication apparatus may be the foregoing non-AP MLD. In other words, the communication apparatus shown in FIG. 9 may be configured to perform steps, functions, and the like performed by the non-AP MLD in the method embodiments. For example, the communication apparatus may be a non-AP MLD, a chip, or the like. This is not limited in this embodiment of this application.

In a design, the transceiver unit 10 is configured to send a first association request frame on a first link, and receive a first association response frame on the first link. The first association request frame includes a multi-link element, the multi-link element includes indication information, and the indication information indicates a second link. The first association response frame includes a first status code field and a multi-link element, the multi-link element of the first association response frame includes a second status code field, a value of the first status code field is not 0, to indicate that the first link is not accepted, and the second status code field is set to a first value that is not 0, to indicate that a cause why the second link is not accepted is that the first link is not accepted.

For example, the processing unit 20 is configured to generate the first association request frame, and use or control the transceiver unit 10 to send the first association request frame.

In a possible implementation, the transceiver unit 10 is further configured to send a second association request frame on the second link, and receive a second association response frame on the second link.

For example, the processing unit 20 is configured to generate the second association request frame, and use or control the transceiver unit 10 to send the second association request frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 4). Details are not described herein again.

In another design, the transceiver unit 10 is configured to send a first association request frame on a first link, and receive a first association response frame on the first link. The first association request frame includes a multi-link element, the multi-link element includes indication information, and the indication information indicates a second link. The first association response frame includes a first status code field and a multi-link element, the multi-link element of the first association response frame includes a second status code field, a value of the first status code field is not 0 and a value of the second status code field is 0, to jointly indicate that a cause why the second link is not accepted is that the first link is not accepted.

For example, the processing unit 20 is configured to generate the first association request frame, and use or control the transceiver unit 10 to send the first association request frame.

In a possible implementation, the transceiver unit 10 is further configured to send a second association request frame on the second link, and receive a second association response frame on the second link.

For example, the processing unit 20 is configured to generate the second association request frame, and use or control the transceiver unit 10 to send the second association request frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 7). Details are not described herein again.

In still another design, the transceiver unit 10 is configured to send a first association request frame on a first link, and receive a first association response frame on the first link. The first association request frame includes a multi-link element, the multi-link element includes indication information, and the indication information indicates a second link. The first association response frame includes a first status code field, and the first status code field is set to a second value that is not 0, to indicate that multi-link setup between the non-AP MLD and an AP MLD fails, and that if the association request frame is transmitted on another requested link, multi-link setup may succeed.

For example, the processing unit 20 is configured to generate the first association request frame, and use or control the transceiver unit 10 to send the first association request frame.

In a possible implementation, the transceiver unit 10 is further configured to send a second association request frame on the second link, and receive a second association response frame on the second link.

For example, the processing unit 20 is configured to generate the second association request frame, and use or control the transceiver unit 10 to send the second association request frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 8). Details are not described herein again.

Still refer to FIG. 9. In some other embodiments of this application, the communication apparatus may be the foregoing AP MLD. In other words, the communication apparatus shown in FIG. 9 may be configured to perform steps, functions, and the like performed by the AP MLD in the method embodiments. For example, the communication apparatus may be an AP MLD, a chip, or the like. This is not limited in this embodiment of this application.

In a design, the transceiver unit 10 is configured to receive a first association request frame on a first link, and send a first association response frame on the first link. The first association request frame includes a multi-link element, the multi-link element includes indication information, and the indication information indicates a second link. The first association response frame includes a first status code field and a multi-link element, the multi-link element of the first association response frame includes a second status code field, a value of the first status code field is not 0, to indicate that the first link is not accepted, and the second status code field is set to a first value that is not 0, to indicate that a cause why the second link is not accepted is that the first link is not accepted.

For example, the processing unit 20 is configured to generate the first association response frame, and use or control the transceiver unit 10 to send the first association response frame.

In a possible implementation, the transceiver unit 10 is further configured to receive a second association request frame on the second link, and send a second association response frame on the second link.

For example, the processing unit 20 is configured to generate the second association response frame, and use or control the transceiver unit 10 to send the second association response frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 4). Details are not described herein again.

In another design, the transceiver unit 10 is configured to receive a first association request frame on a first link, and send a first association response frame on the first link. The first association request frame includes a multi-link element, the multi-link element includes indication information, and the indication information indicates a second link. The first association response frame includes a first status code field and a multi-link element, the multi-link element of the first association response frame includes a second status code field, a value of the first status code field is not 0 and a value of the second status code field is 0, to jointly indicate that a cause why the second link is not accepted is that the first link is not accepted.

For example, the processing unit 20 is configured to generate the first association response frame, and use or control the transceiver unit 10 to send the first association response frame.

In a possible implementation, the transceiver unit 10 is further configured to receive a second association request frame on the second link, and send a second association response frame on the second link.

For example, the processing unit 20 is configured to generate the second association response frame, and use or control the transceiver unit 10 to send the second association response frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 7). Details are not described herein again.

In still another design, the transceiver unit 10 is configured to receive a first association request frame on a first link, and send a first association response frame on the first link. The first association request frame includes a multi-link element, the multi-link element includes indication information, and the indication information indicates a second link. The first association response frame includes a first status code field, and the first status code field is set to a second value that is not 0, to indicate that multi-link setup between the non-AP MLD and an AP MLD fails, and that if the association request frame is transmitted on another requested link, multi-link setup may succeed.

For example, the processing unit 20 is configured to generate the first association response frame, and use or control the transceiver unit 10 to send the first association response frame.

In a possible implementation, the transceiver unit 10 is further configured to receive a second association request frame on the second link, and send a second association response frame on the second link.

For example, the processing unit 20 is configured to generate the second association response frame, and use or control the transceiver unit 10 to send the second association response frame.

It may be understood that for specific descriptions of the first association request frame, the first association response frame, the second association request frame, the second association response frame, and the like, refer to the method embodiments. Details are not described herein again.

It may be understood that specific descriptions of the transceiver unit and the processing unit in this embodiment of this application are merely examples. For specific functions or steps performed by the transceiver unit and the processing unit, refer to the method embodiment (as shown in FIG. 8). Details are not described herein again.

The foregoing describes the non-AP MLD and the AP MLD in embodiments of this application, and the following describes possible product forms of the non-AP MLD and the AP MLD. It should be understood that any product in any form that has the function of the non-AP MLD described in FIG. 9 and any product in any form that has the function of the AP MLD described in FIG. 9 fall within the protection scope of embodiments of this application. It should further be understood that the following descriptions are merely examples, and do not limit product forms of the non-AP MLD and the AP MLD in this embodiment of this application.

In a possible implementation, in the communication apparatus shown in FIG. 9, the processing unit 20 may be one or more processors, the transceiver unit 10 may be a transceiver. Alternatively, the transceiver unit 10 may be a sending unit and a receiving unit, the sending unit may be a transmitter, and the receiving unit may be a receiver. The sending unit and the receiving unit are integrated into one component, for example, a transceiver. In this embodiment of this application, the processor and the transceiver may be coupled, or the like. A connection manner between the processor and the transceiver is not limited in this embodiment of this application. In a process of performing the method, a process of sending information (for example, sending a first association request frame, a first association response frame, a second association request frame, or a second association response frame) in the method may be understood as a process in which the processor outputs the information. When outputting the information, the processor outputs the information to the transceiver, so that the transceiver transmits the information. After the information is output by the processor, other processing may further need to be performed on the information before the information arrives at the transceiver. Similarly, a process of receiving information (for example, receiving a first association request frame, a first association response frame, a second association request frame, or a second association response frame) in the method may be understood as a process in which the processor receives the input information. When the processor receives the input information, the transceiver receives the information, and inputs the information to the processor. Further, after the transceiver receives the information, other processing may need to be performed on the information before the information is input into the processor.

Figure 10:
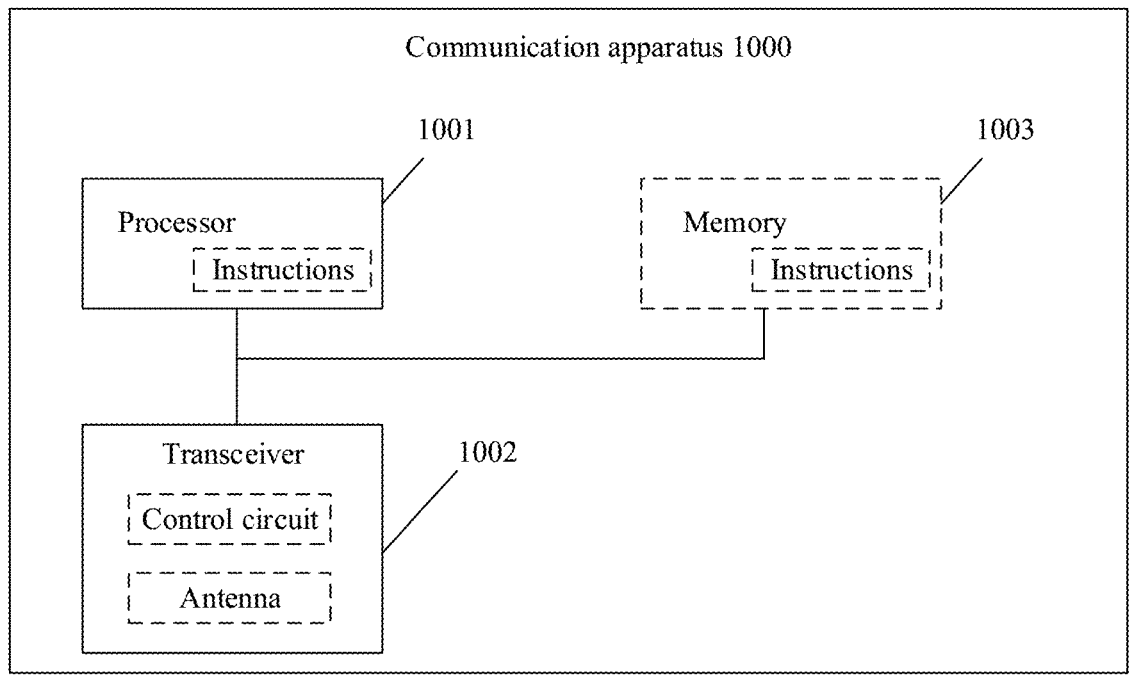
FIG. 10 is a schematic diagram of a structure of a communication apparatus 1000 according to an embodiment of this application.

FIG. 10 is a schematic diagram of a structure of a communication apparatus 1000 according to an embodiment of this application. The communication apparatus 1000 may be a first communication apparatus, a second communication apparatus, or a chip thereof. FIG. 10 shows only main components of the communication apparatus 1000. In addition to a processor 1001 and a transceiver 1002, the communication apparatus may further include a memory 1003 and an input/output apparatus (not shown in the figure).

The processor 1001 is mainly configured to process a communication protocol and communication data, control the communication apparatus, execute a software program, and process data of the software program. The memory 1003 is mainly configured to store the software program and the data. The transceiver 1002 may include a control circuit and an antenna. The control circuit is mainly configured to perform conversion between a baseband signal and a radio frequency signal and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus is powered on, the processor 1001 may read the software program in the memory 1003, interpret and execute instructions of the software program, and process data of the software program. When data needs to be sent wirelessly, the processor 1001 performs baseband processing on the to-be-sent data, and then outputs a baseband signal to a radio frequency circuit.

The radio frequency circuit performs radio frequency processing on the baseband signal, and then sends a radio frequency signal in an electromagnetic wave form through the antenna. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

The processor 1001, the transceiver 1002, and the memory 1003 may be connected through a communication bus.

In a design, the communication apparatus 1000 may be configured to perform a function of the non-AP MLD in Embodiment 1. The processor 1001 may be configured to: generate the first association request frame sent in step S101 and the second association request frame sent in step S103 in FIG. 4; and/or perform another process for performing the technologies described in this specification. The transceiver 1002 may be configured to: perform step S101, step S103, and the like in FIG. 4; and/or perform another process of the technologies described in this specification.

In another design, the communication apparatus 1000 may be configured to perform a function of the AP MLD in Embodiment 1. The processor 1001 may be configured to: generate the first association response frame sent in step S102 and the second association response frame sent in step S104 in FIG. 4; and/or perform another process for performing the technologies described in this specification. The transceiver 1002 may be configured to: perform step S102 and step S104 in FIG. 4; and/or perform another process of the technologies described in this specification.

In a design, the communication apparatus 1000 may be configured to perform a function of the non-AP MLD in Embodiment 2. The processor 1001 may be configured to: generate the first association request frame sent in step S201 and the second association request frame sent in step S203 in FIG. 7; and/or perform another process for performing the technologies described in this specification. The transceiver 1002 may be configured to: perform step S201, step S203, and the like in FIG. 7; and/or perform another process of the technologies described in this specification.

In another design, the communication apparatus 1000 may be configured to perform a function of the AP MLD in Embodiment 2. The processor 1001 may be configured to: generate the first association response frame sent in step S202 and the second association response frame sent in step S204 in FIG. 7; and/or perform another process for performing the technologies described in this specification. The transceiver 1002 may be configured to: perform step S202 and step S204 in FIG. 7; and/or perform another process of the technologies described in this specification.

In a design, the communication apparatus 1000 may be configured to perform a function of the non-AP MLD in Embodiment 3. The processor 1001 may be configured to: generate the first association request frame sent in step S301 and the second association request frame sent in step S303 in FIG. 8; and/or perform another process for performing the technologies described in this specification. The transceiver 1002 may be configured to: perform step S301, step S303, and the like in FIG. 8; and/or perform another process of the technologies described in this specification.

In another design, the communication apparatus 1000 may be configured to perform a function of the AP MLD in Embodiment 3. The processor 1001 may be configured to: generate the first association response frame sent in step S302 and the second association response frame sent in step S304 in FIG. 8; and/or perform another process for performing the technologies described in this specification. The transceiver 1002 may be configured to: perform step S302 and step S304 in FIG. 8; and/or perform another process of the technologies described in this specification.

In any one of the foregoing designs, the processor 1001 may include a transceiver configured to implement sending and receiving functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instruction may be a computer program. The computer program is run on the processor 1001, so that the communication apparatus 1000 can perform the method described in the foregoing method embodiments. The computer program may be fixed in the processor 1001, and in this case, the processor 1001 may be implemented by hardware.

In an implementation, the communication apparatus 1000 may include a circuit, and the circuit may implement a sending, receiving, or communication function in the foregoing method embodiments. The processor and the transceiver described in this application may be implemented on an integrated circuit (integrated circuit, IC), an analog IC, a radio frequency integrated circuit (radio frequency integrated circuit, RFIC), a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal-oxide semiconductor (N-type Metal-oxide semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited to FIG. 10. The communication apparatus may be an independent device or may be a part of a large device. For example, the communication apparatus may be:

(1) an independent integrated circuit IC, a chip, or a chip system or subsystem;
(2) a set including one or more ICs, where optionally, the set of ICs may further include a storage component configured to store data and a computer program;
(3) an ASIC such as a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 11:
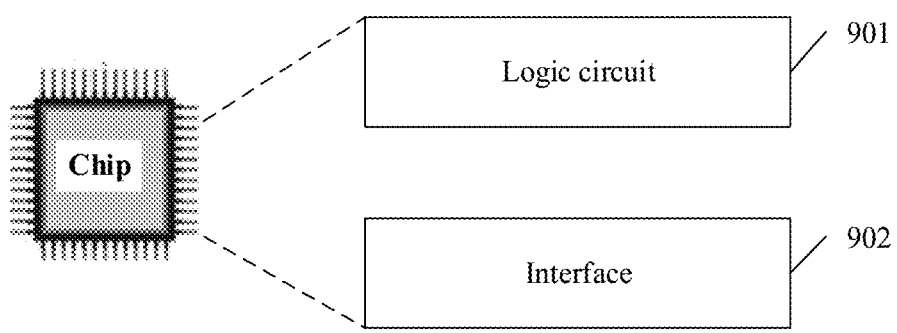
FIG. 11 is a schematic diagram of another structure of a communication apparatus according to an embodiment of this application.

In another possible implementation, in the communication apparatus shown in FIG. 9, the processing unit 20 may be one or more logic circuits, and the transceiver unit 10 may be an input/output interface, or referred to as a communication interface, an interface circuit, an interface, or the like. Alternatively, the transceiver unit 10 may be a sending unit and a receiving unit. The sending unit may be an output interface, and the receiving unit may be an input interface. The sending unit and the receiving unit are integrated into one unit, for example, an input/output interface. FIG. 11 is a schematic diagram of another structure of a communication apparatus according to an embodiment of this application. As shown in FIG. 11, the communication apparatus shown in FIG. 11 includes a logic circuit 901 and an interface 902. In other words, the processing unit 20 may be implemented by using the logic circuit 901, and the transceiver unit 10 may be implemented by using the interface 902. The logic circuit 901 may be a chip, a processing circuit, an integrated circuit, a system on chip (system on chip, SoC) chip, or the like. The interface 902 may be a communication interface, an input/output interface, a pin, or the like. For example, FIG. 11 shows an example in which the communication apparatus is used as a chip. The chip includes the logic circuit 901 and the interface 902.

In this embodiment of this application, the logic circuit may further be coupled to the interface. A specific connection manner of the logical circuit and the interface is not limited in this embodiment of this application.

For example, when the communication apparatus is configured to perform the method, functions, or steps performed by the non-AP MLD in Embodiment 1, Embodiment 2, or Embodiment 3, the logic circuit 901 is configured to generate the first association request frame. The interface 902 is configured to output the first association request frame. The interface 902 is further configured to input the first association response frame.

For example, when the communication apparatus is configured to perform the method, functions, or steps performed by the AP MLD in Embodiment 1, Embodiment 2, or Embodiment 3, the interface 902 is configured to input the first association request frame. The logic circuit 901 is configured to generate the first association response frame. The interface 902 is further configured to output the first association response frame.

It may be understood that for specific descriptions of the first association request frame, the first association response frame, and the like, refer to the method embodiments. Details are not described herein again.

It may be understood that the communication apparatus shown in this embodiment of this application may implement the method provided in embodiments of this application in a form of hardware or in a form of software. This is not limited in embodiments of this application.

For specific implementations of embodiments shown in FIG. 11, refer to the foregoing embodiments. Details are not described herein again.

An embodiment of this application further provides a wireless communication system. The wireless communication system includes a non-AP MLD and an AP MLD, and the non-AP MLD and the AP MLD may be configured to perform the method in any one of the foregoing embodiments.

In addition, this application further provides a computer program. The computer program is configured to implement an operation and/or processing performed by the non-AP MLD in the method provided in this application.

This application further provides a computer program. The computer program is configured to implement an operation and/or processing performed by the AP MLD in the method provided in this application.

This application further provides a computer-readable storage medium. The computer-readable storage medium stores computer code. When the computer code is run on a computer, the computer is enabled to perform an operation and/or processing performed by the non-AP MLD in the method provided in this application.

This application further provides a computer-readable storage medium. The computer-readable storage medium stores computer code. When the computer code is run on a computer, the computer is enabled to perform an operation and/or processing performed by the AP MLD in the method provided in this application.

This application further provides a computer program product. The computer program product includes computer code or a computer program. When the computer code or the computer program is run on a computer, an operation and/or processing performed by a non-AP MLD device in the method provided in this application are/is performed.

This application further provides a computer program product. The computer program product includes computer code or a computer program. When the computer code or the computer program is run on a computer, an operation and/or processing performed by an AP MLD in the method provided in this application are/is performed.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the technical effects of the solutions provided in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the methods described in embodiments of this application. The readable-storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-link communication setup method, comprising:
sending, by a first station of a non-access point multi-link device (non-AP MLD), a first association request frame on a first link, wherein the first association request frame comprises a multi-link element, the multi-link element comprises indication information indicating a second link; and
receiving, by the first station of the non-AP MLD, a first association response frame on the first link, wherein the first association response frame comprises a first status code field and a multi-link element, the multi-link element of the first association response frame comprises a second status code field, and wherein a non-zero value of the first status code field indicates that the first link is not accepted, and the second status code field is set to a non-zero value to indicate that a reason that the second link is not accepted is because the first link is not accepted.

2. The method according to claim 1, wherein the first status code field is located outside the multi-link element of the first association response frame.

3. The method according to claim 1, wherein the second status code field is comprised in a STA profile subfield of a per-STA profile subelement.

4. The method according to claim 1, wherein the second status code field is set to the non-zero value to indicate that an only reason that the second link is not accepted is because the first link is not accepted.

5. The method according to claim 1, wherein the method further comprises:
after receiving the first association response frame, sending, by a second station of the non-AP MLD, a second association request frame on the second link; and
receiving, by the second station of the non-AP MLD, a second association response frame on the second link.

6. A communication apparatus comprising at least one processor configured to cause the apparatus to:
send a first association request frame on a first link, wherein the first association request frame comprises a multi-link element, the multi-link element comprises indication information indicating a second link; and
receive a first association response frame on the first link, wherein the first association response frame comprises a first status code field and a multi-link element, the multi-link element of the first association response frame comprises a second status code field, and wherein a non-zero value of the first status code field to indicates that the first link is not accepted, and the second status code field is set to a non-zero value to indicate that a reason that the second link is not accepted is because the first link is not accepted.

7. The communication apparatus according to claim 6, wherein the at least one processor is configured to cause the apparatus to:
send a second association request frame on the second link; and
receive a second association response frame on the second link.

8. The communication apparatus according to claim 6, wherein the first status code field is located outside the multi-link element of the first association response frame.

9. The communication apparatus according to claim 6, wherein the second status code field is comprised in a STA profile subfield of a per-STA profile subelement.

10. The communication apparatus according to claim 6, wherein the second status code field is set to the non-zero value to indicate that an only reason that the second link is not accepted is because the first link is not accepted.

11. A non-transitory computer-readable storage medium for execution by a non-access point multi-link device (non-AP MLD) to perform operations comprising:
sending, by a first station of the non-AP MLD, a first association request frame on a first link, wherein the first association request frame comprises a multi-link element, the multi-link element comprises indication information indicating a second link; and
receiving, by the first station of the non-AP MLD, a first association response frame on the first link, wherein the first association response frame comprises a first status code field and a multi-link element, the multi-link element of the first association response frame comprises a second status code field, and wherein a non-zero value of the first status code field indicates that the first link is not accepted, and the second status code field is set to a non-zero value to indicate that a reason that the second link is not accepted is because the first link is not accepted.

12. The non-transitory computer-readable storage medium according to claim 11, wherein the first status code field is located outside the multi-link element of the first association response frame.

13. The non-transitory computer-readable storage medium according to claim 11, wherein the second status code field is comprised in a STA profile subfield of a per-STA profile subelement.

14. The non-transitory computer-readable storage medium according to claim 11, wherein the second status code field is set to the non-zero value to indicate that an only reason that the second link is not accepted is because the first link is not accepted.

15. The non-transitory computer-readable storage medium according to claim 11, wherein the operations further comprise:
after receiving the first association response frame, sending, by a second station of the non-AP MLD, a second association request frame on the second link; and
receiving, by the second station of the non-AP MLD, a second association response frame on the second link.

* * * * *

UNITED STATES PATENT AND TRADEMARK OFFICE
CERTIFICATE OF CORRECTION

| | |
|---|---|
| PATENT NO. | : 11,956,842 B2 |
| APPLICATION NO. | : 18/335527 |
| DATED | : April 9, 2024 |
| INVENTOR(S) | : Yuchen Guo et al. |

It is certified that error appears in the above-identified patent and that said Letters Patent is hereby corrected as shown below:

In the Claims

Column 40, Line 2, Claim 6, after "field" please delete "to".

Signed and Sealed this
Twentieth Day of August, 2024

Katherine Kelly Vidal
Director of the United States Patent and Trademark Office